Figure 1:
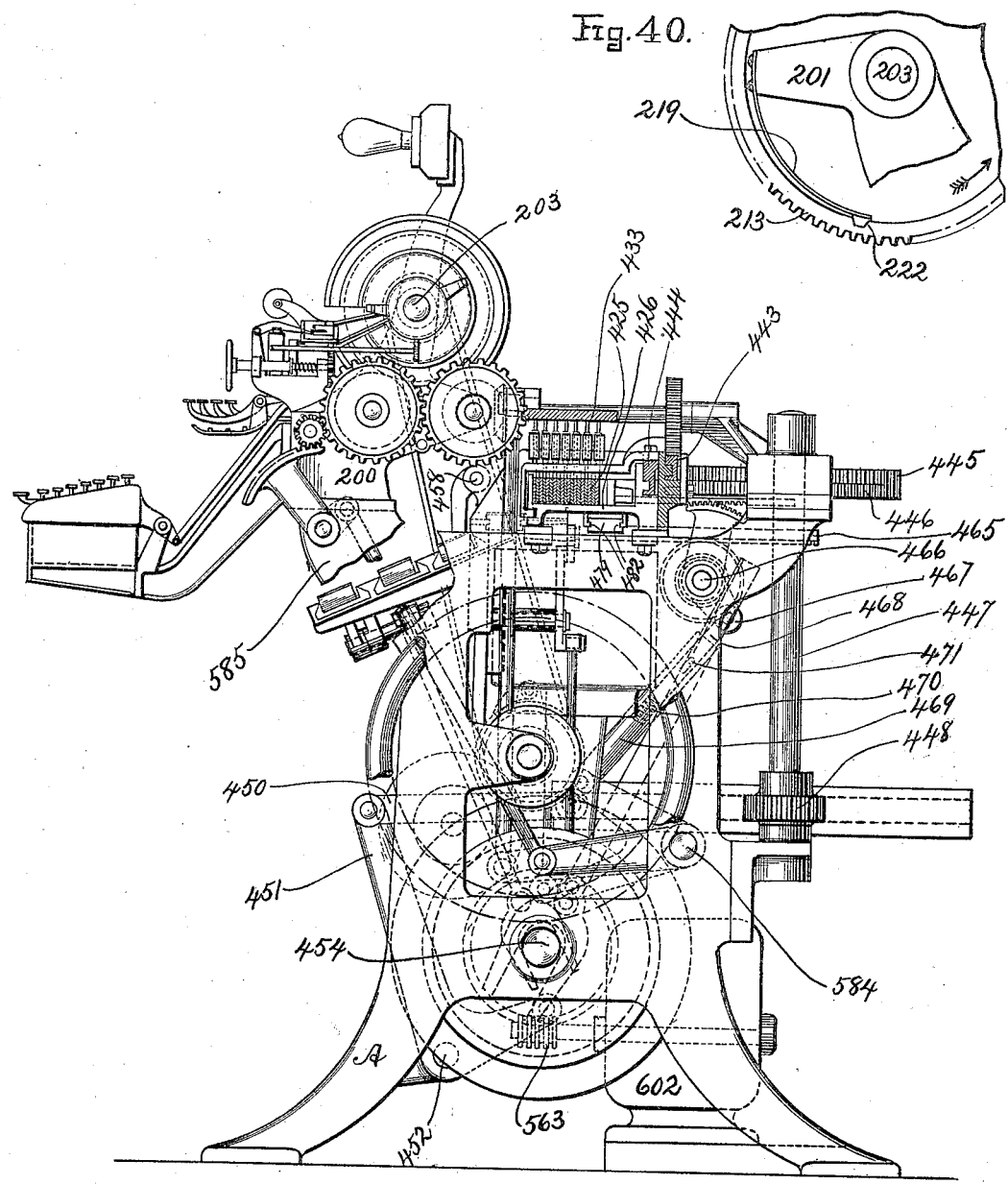

No. 696,360. Patented Mar. 25, 1902.
E. V. BEALS.
MACHINE FOR PRODUCING PRINTING BARS.
(Application filed Sept. 13, 1898.)
(No Model.)
13 Sheets—Sheet 2.

WITNESSES
H. S. Chapin.
M. B. Wilson.

INVENTOR
Erl. V. Beals
by P. E. Teschemacher
Atty

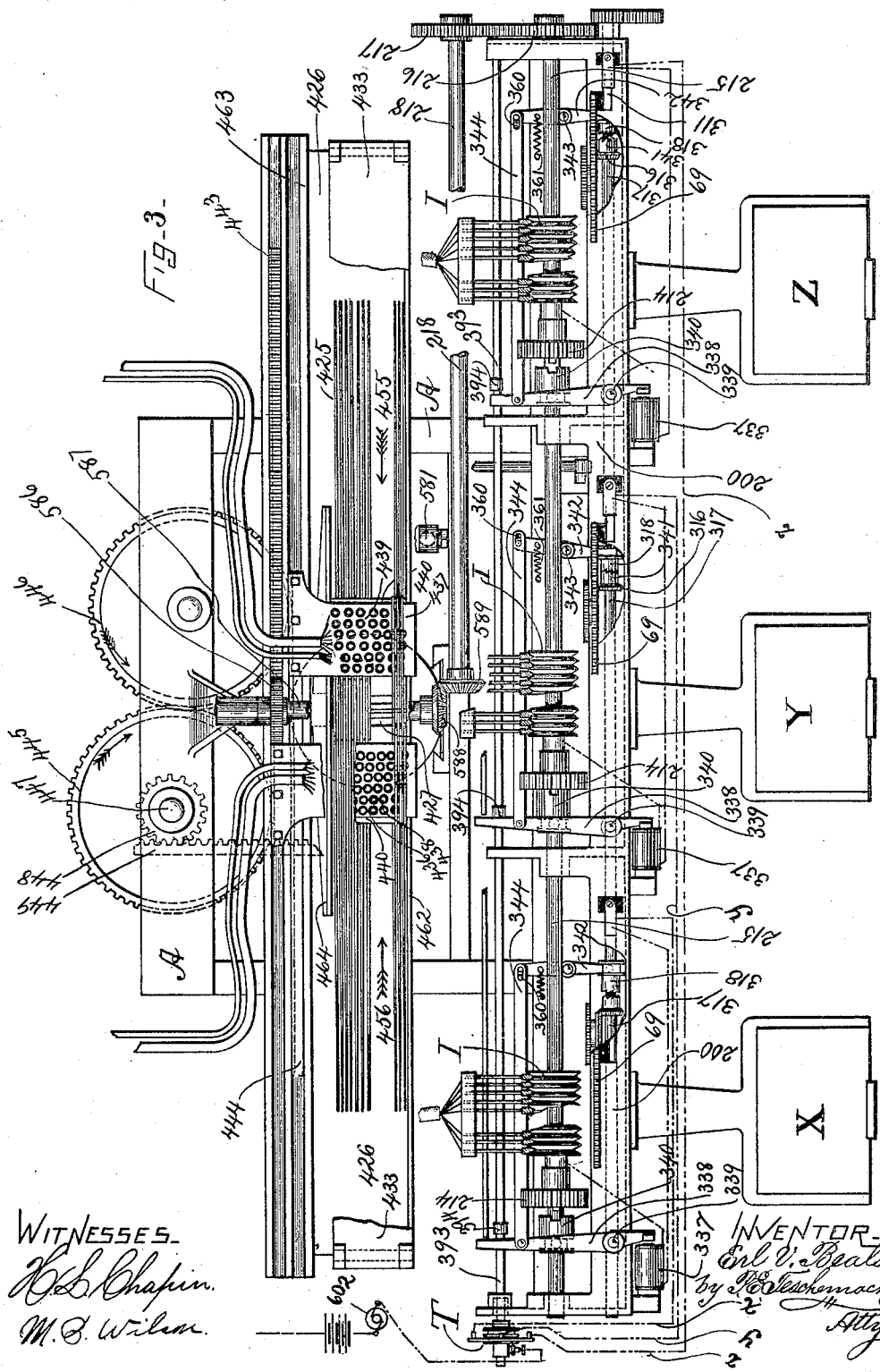

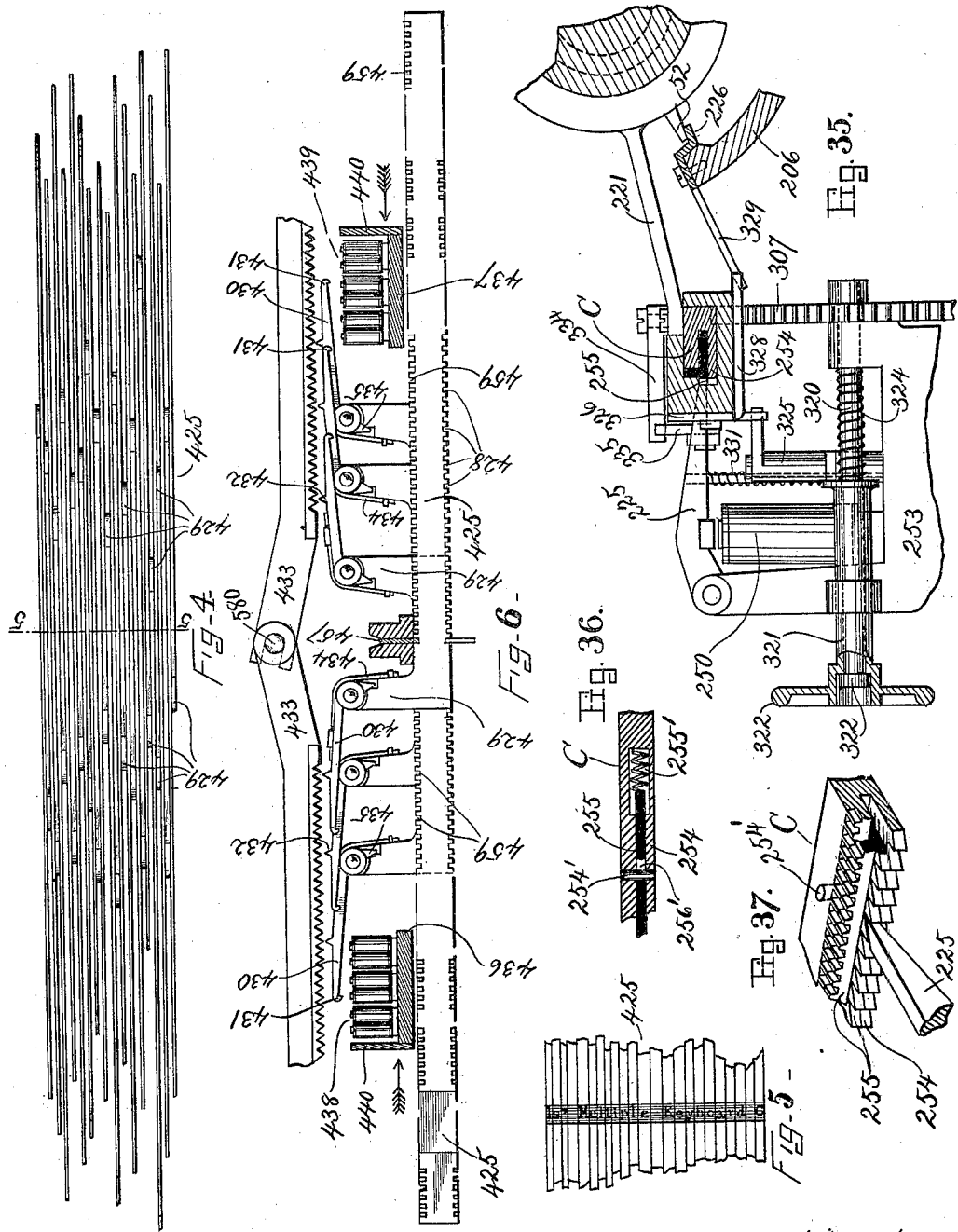

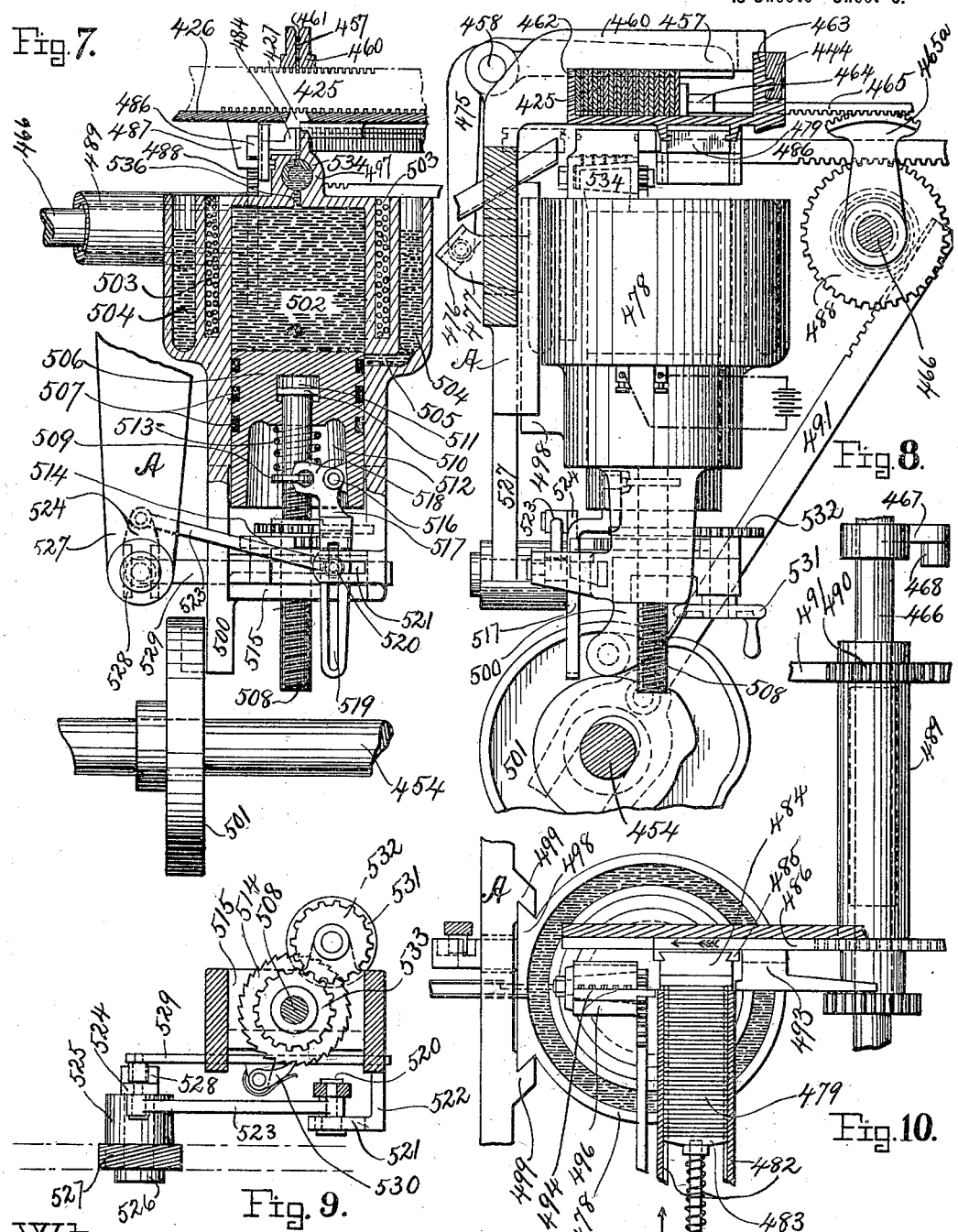
No. 696,360. Patented Mar. 25, 1902.
E. V. BEALS.
MACHINE FOR PRODUCING PRINTING BARS.
(Application filed Sept. 13, 1898.)
(No Model.) 13 Sheets—Sheet 5.

No. 696,360. Patented Mar. 25, 1902.
E. V. BEALS.
MACHINE FOR PRODUCING PRINTING BARS.
(Application filed Sept. 13, 1898.)
(No Model.) 13 Sheets—Sheet 6.
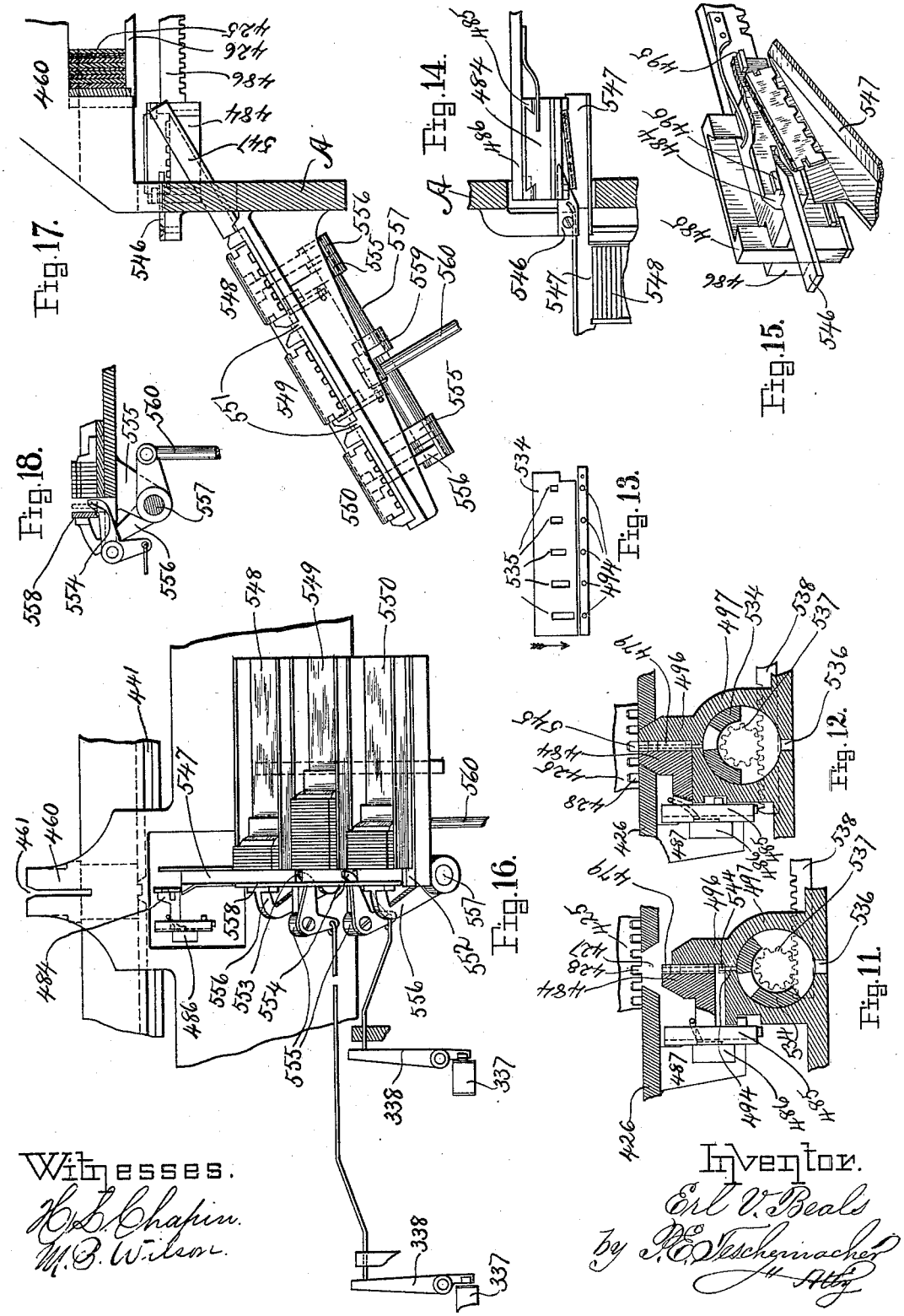

No. 696,360.  
E. V. BEALS.  
MACHINE FOR PRODUCING PRINTING BARS.  
(Application filed Sept. 13, 1898.)  
(No Model.)  
Patented Mar. 25, 1902.  
13 Sheets—Sheet 7.
Fig. 28.
Fig. 24.
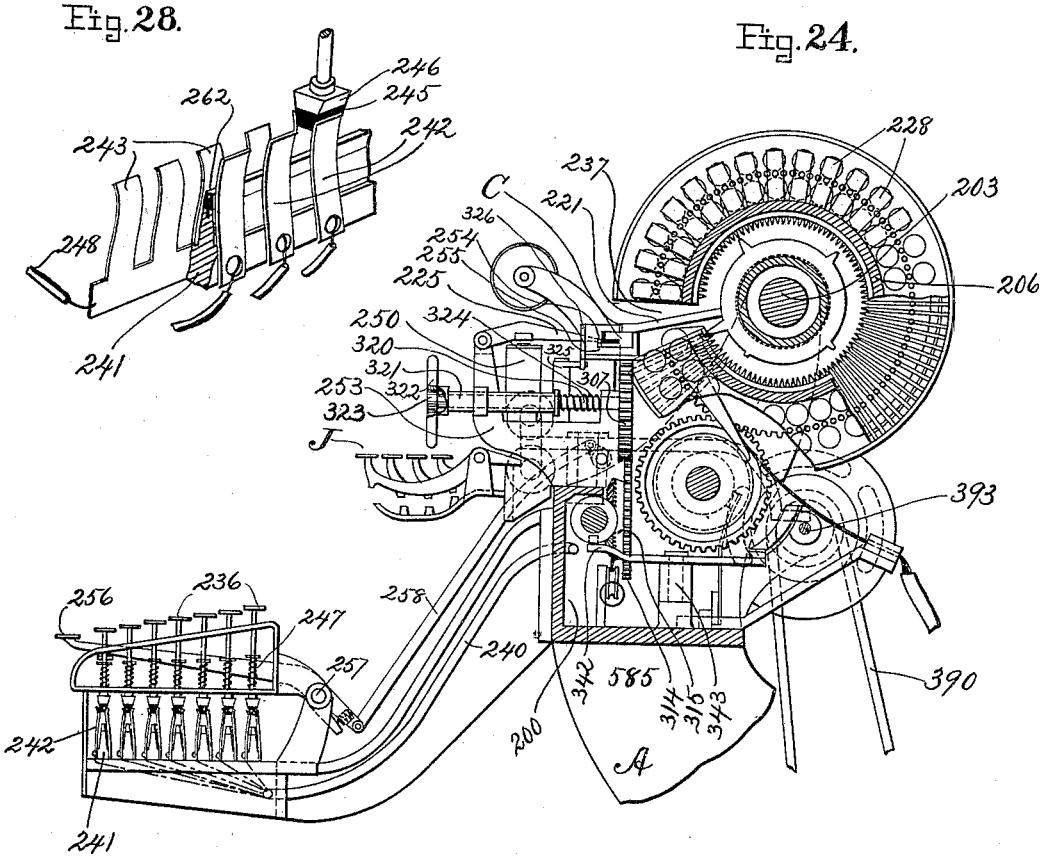
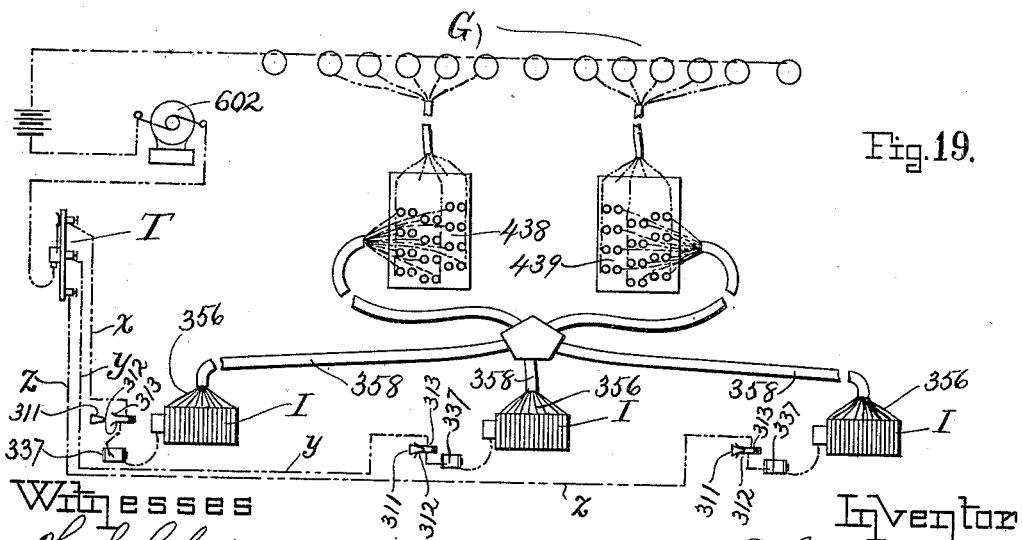
Fig. 19.
Witnesses  
H. B. Chapin.  
M. B. Wilson.
Inventor  
Erl V. Beals  
by J. E. Teschemacher  
Atty.

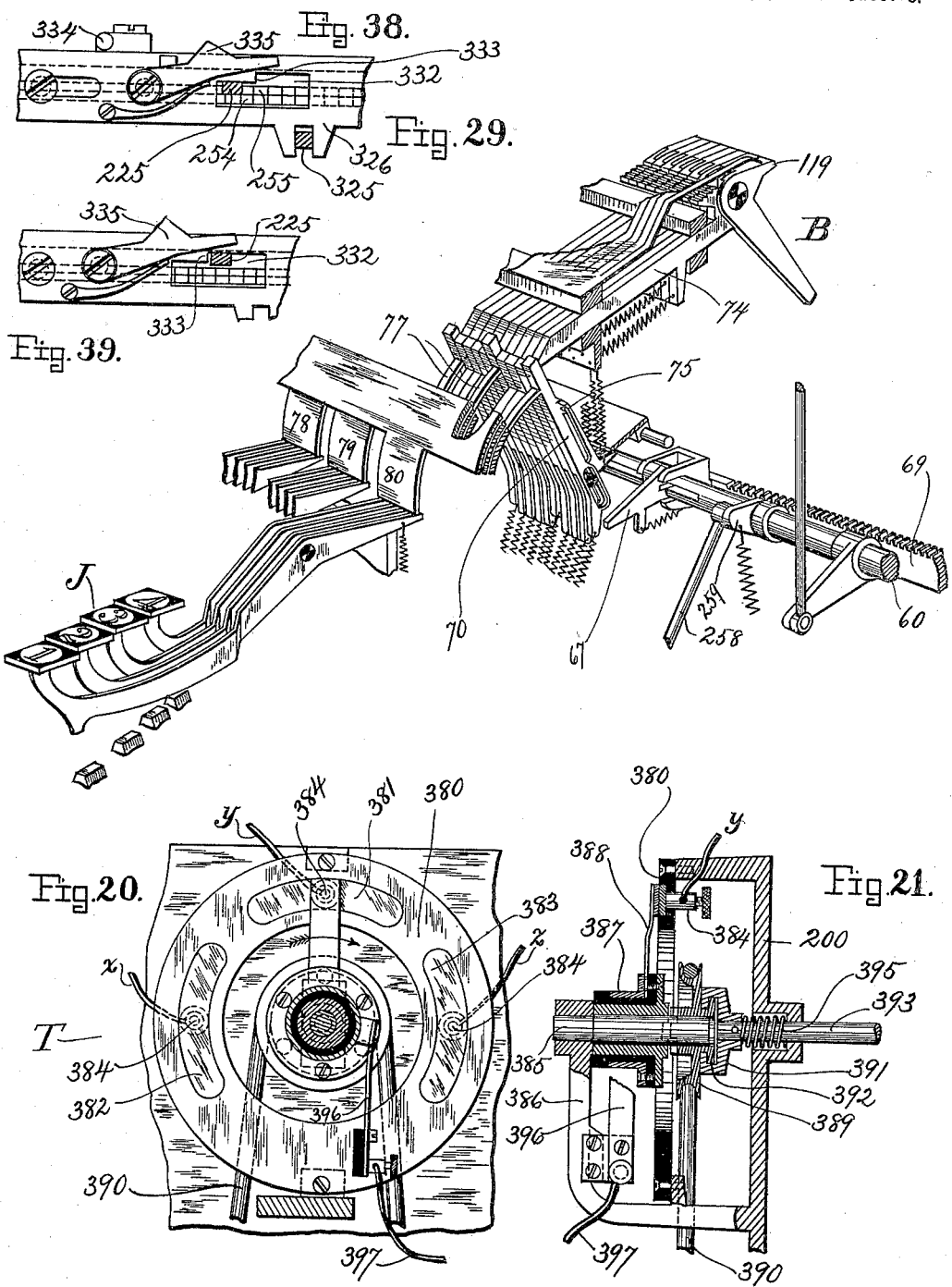

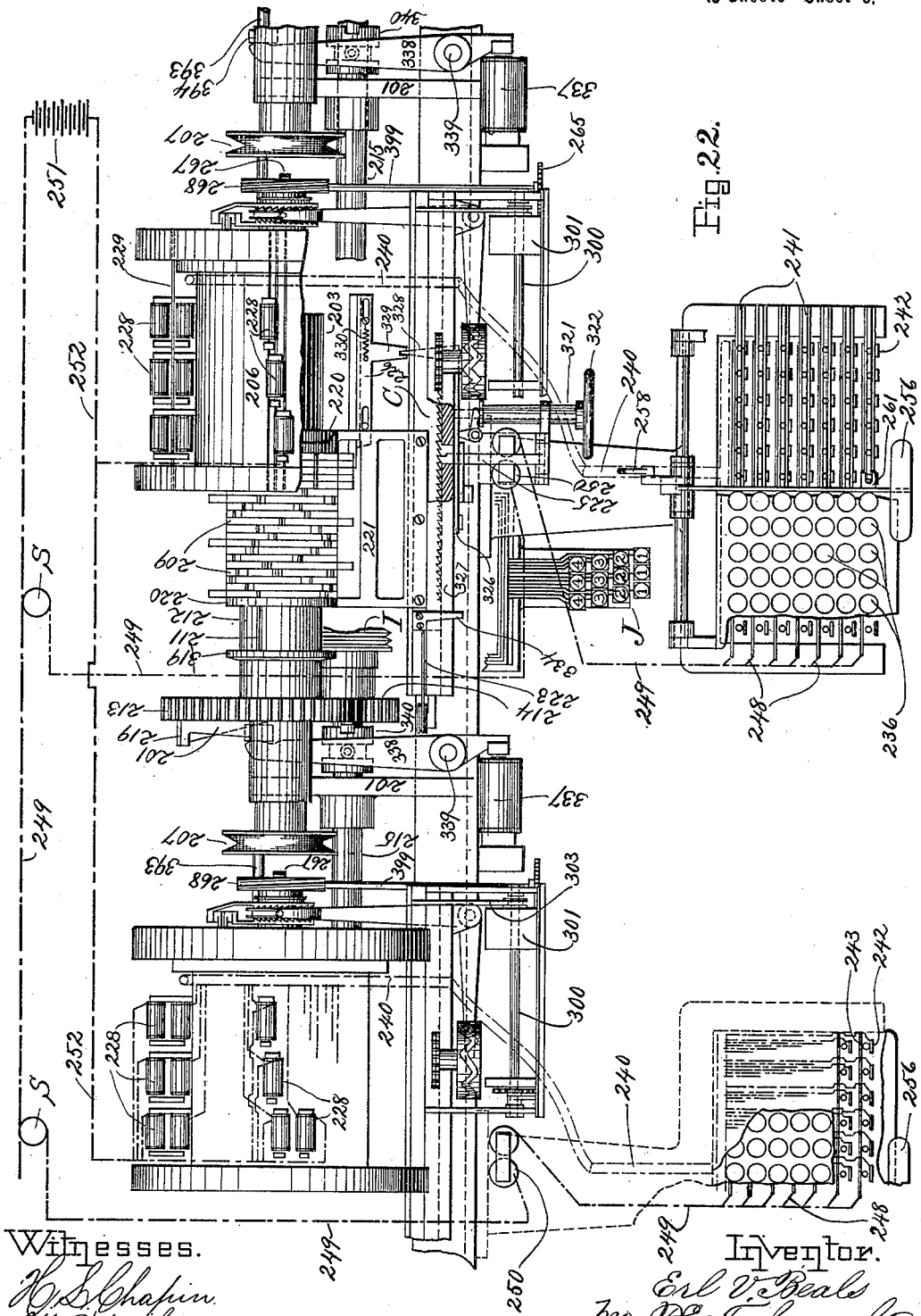

No. 696,360. Patented Mar. 25, 1902.
E. V. BEALS.
MACHINE FOR PRODUCING PRINTING BARS.
(Application filed Sept. 13, 1898.)
(No Model.) 13 Sheets—Sheet 10.
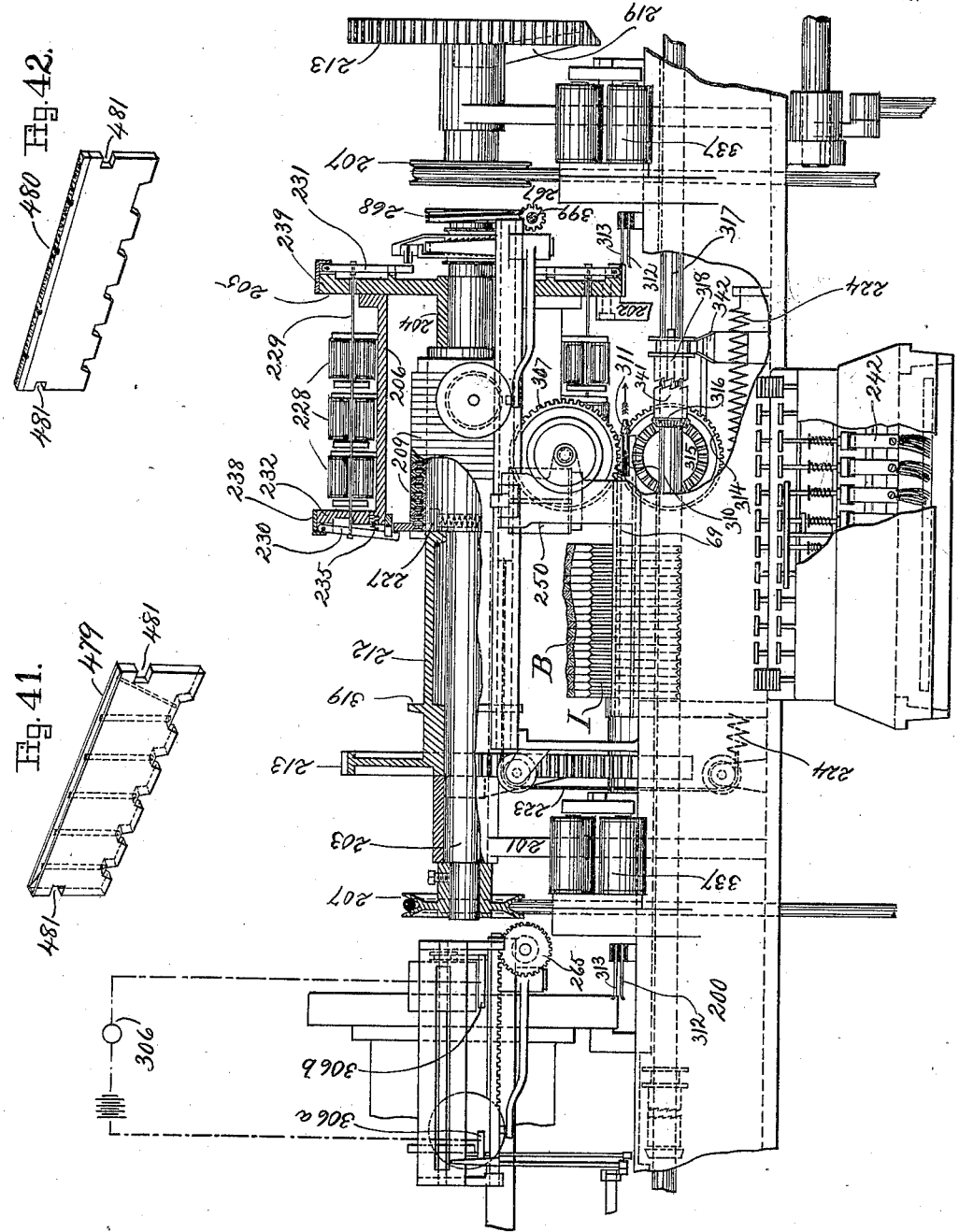
Witnesses
H. S. Chapin.
M. B. Wilson.
Inventor
Erl V. Beals
by R. E. Taschemacher
Atty No. 696,360. Patented Mar. 25, 1902.
E. V. BEALS.
MACHINE FOR PRODUCING PRINTING BARS.
(Application filed Sept. 13, 1898.)
(No Model.)
13 Sheets—Sheet 11.
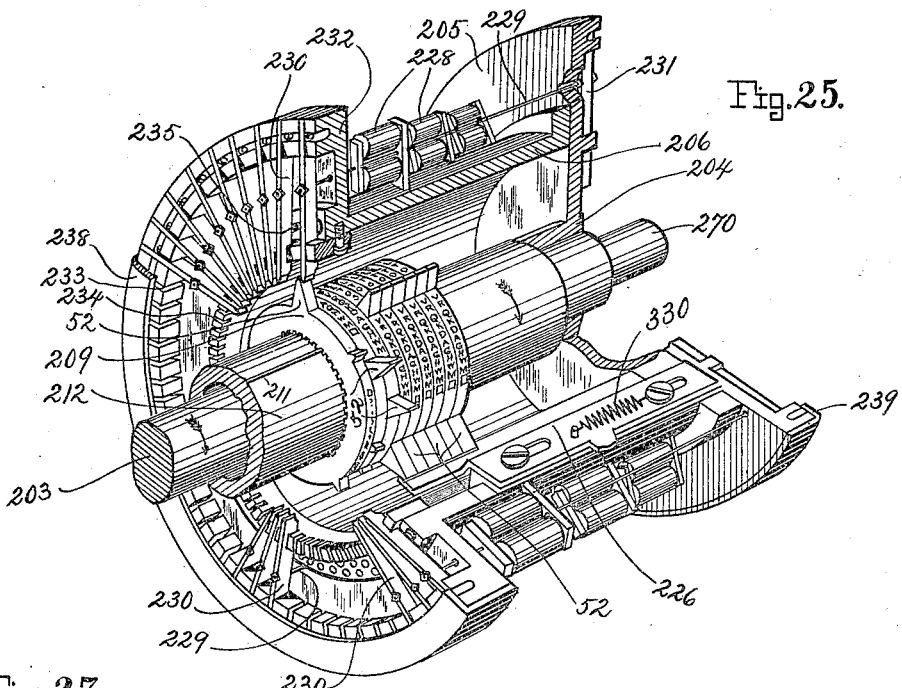
Fig. 25.
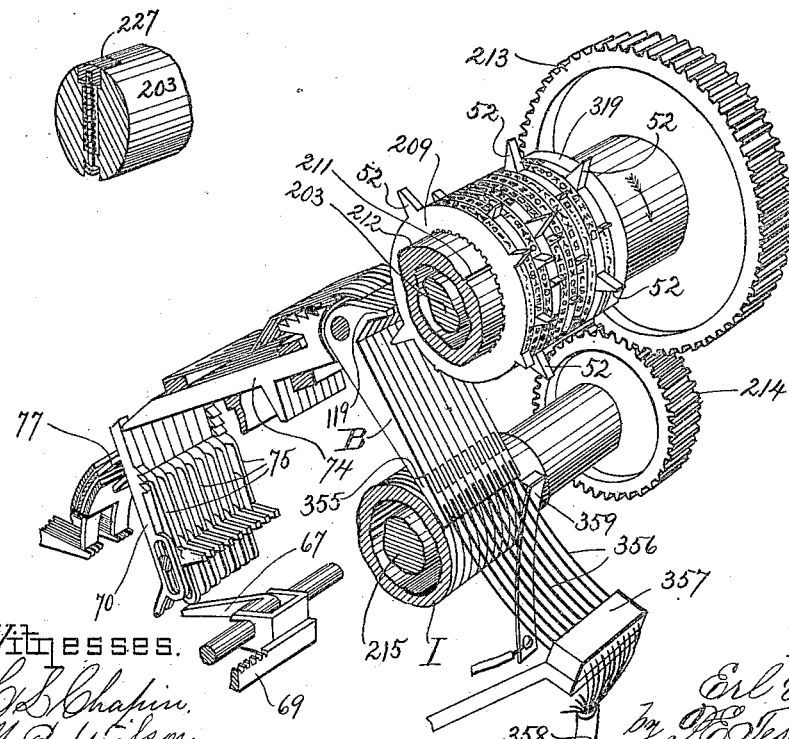
Fig. 27.
Fig. 26.
Witnesses.
H. L. Chapin.
M. B. Wilson.
Inventor.
Erl V. Beals
by P. E. Teschemacher
Atty.

No. 696,360. Patented Mar. 25, 1902.
E. V. BEALS.
MACHINE FOR PRODUCING PRINTING BARS.
(Application filed Sept. 13, 1898.)
(No Model.) 13 Sheets—Sheet 12.
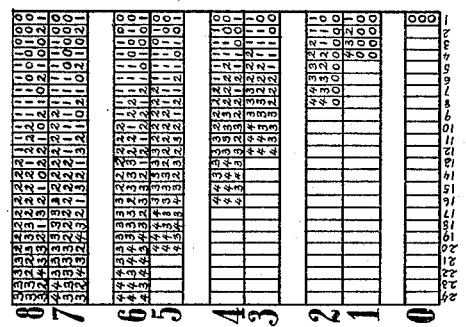
Witnesses
H. L. Chapin.
M. P. Wilson.
Inventor
Earl V. Beals
by P. E. Teschemacher
Atty No. 696,360. Patented Mar. 25, 1902.
E. V. BEALS.
MACHINE FOR PRODUCING PRINTING BARS.
(Application filed Sept. 13, 1898.)
(No Model.) 13 Sheets—Sheet 13.
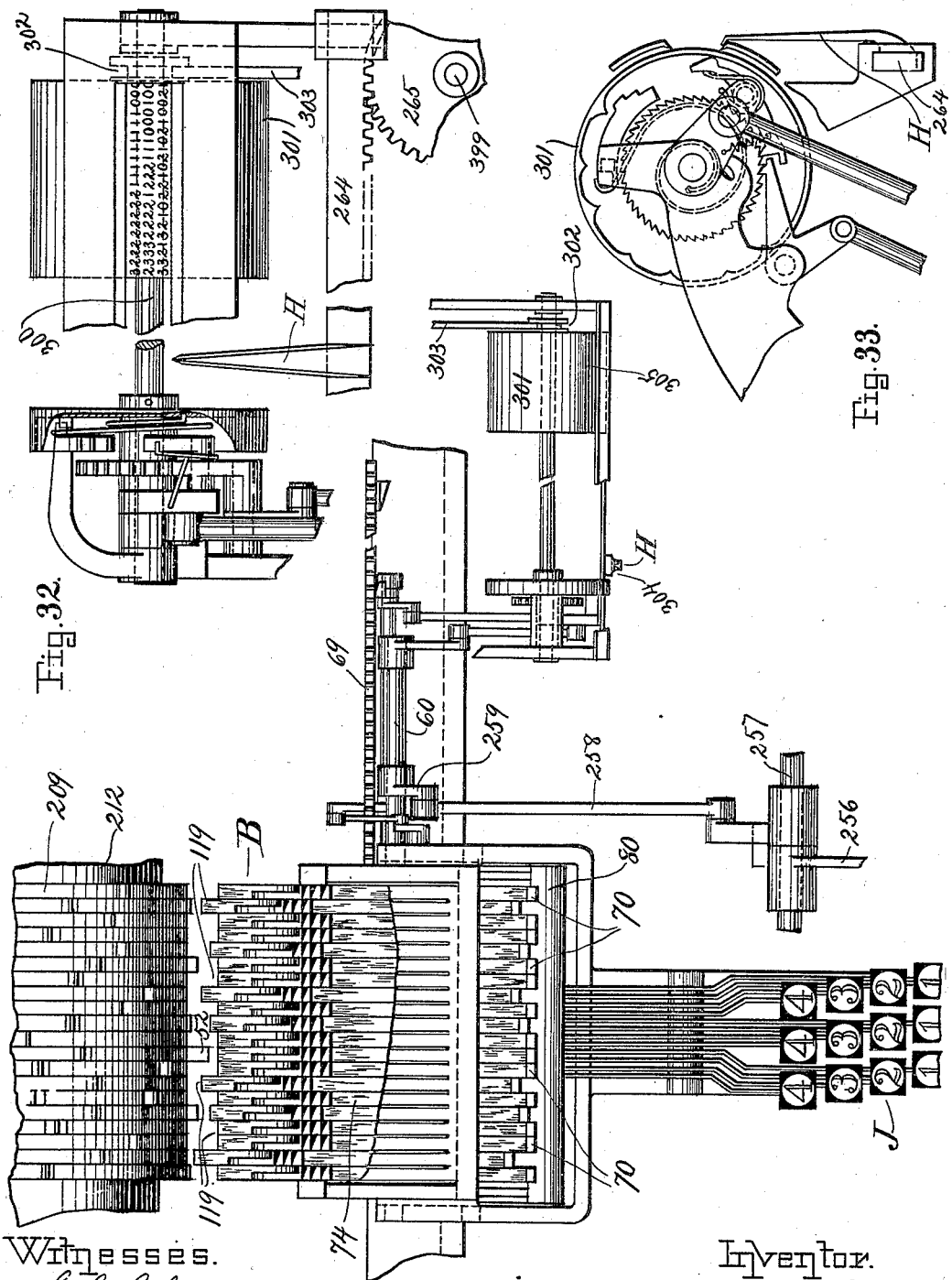
Witnesses.
H. L. Chapin.
M. B. Wilson.
Inventor.
Erl V. Beals
by F. E. Teschemacher
Atty ered and particularly pointed out in the claims.

UNITED STATES PATENT OFFICE.

ERL V. BEALS, OF BOSTON, MASSACHUSETTS.

MACHINE FOR PRODUCING PRINTING-BARS.

SPECIFICATION forming part of Letters Patent No. 696,360, dated March 25, 1902.

Application filed September 13, 1898. Serial No. 690,870. (No model.)

*To all whom it may concern:*

Be it known that I, ERL V. BEALS, a citizen of the United States, residing at Boston, in the county of Suffolk and State of Massachusetts, have invented certain Improvements in Machines for Producing Printing-Bars, of which the following is a specification.

My invention relates to machines for producing printing bars or slugs which bear on one edge, properly justified, the characters required to print an entire line; and my invention has special reference to machines of this character in which a series of parallel sliding matrix-strips are employed, each containing at one edge thereof a series of intaglio letters or characters, said strips being moved independently of each other to assemble the desired characters side by side in a common transverse casting-line to form a matrix, against which metal or plastic material is cast or forced to form a printing bar or slug.

My invention has for its object to improve and simplify the construction of machines of this description and enable them to be operated much more rapidly than heretofore, and also to provide such machines with a plurality of keyboards arranged to be operated at one time by several persons, each seated at one of the keyboards, each keyboard controlling the main machine in turn on the same or on separate and distinct matter without interfering with each other.

In my improved machine two separate and independently-operated groups of mechanism are employed, one controlled by the other at the proper time and moving synchronously therewith. The first of these groups consists of an electrically-controlled matrix-assembling mechanism whereby the movement of each matrix-strip is arrested through the medium of an electromagnet when the selected character thereon has reached a common transverse casting-line. The second group consists of a series of independent line-composing mechanisms, each operated by an independent keyboard and designed to subsequently control the matrix-assembling mechanism when connected therewith, said line-composing mechanisms each comprising a series of rings which are set by the manipulation of the finger-keys to form a cylinder which when rotated synchronously with the matrix-assembling mechanism operates a series of circuit-breakers connected with the magnets controlling the movements of the matrix-strips to bring the required characters thereon to a common line to form a line-matrix from which to cast the printing-bar. The several line-composing mechanisms are so arranged that they all can be operated independently of each other at the same time to arrange or set devices which subsequently automatically and successively control the matrix-assembling and casting mechanism to produce the finished printing-bar, so that one or several operators can manipulate the machine at the same time, employing a single matrix-assembling and casting mechanism only, whereby the product of a single machine is increased in proportion to the number of operators employed thereon.

My invention also embodies many other novel features, combinations of parts, and details of construction, which will be hereinafter fully described, and particularly pointed out in the claims.

Figure 2:
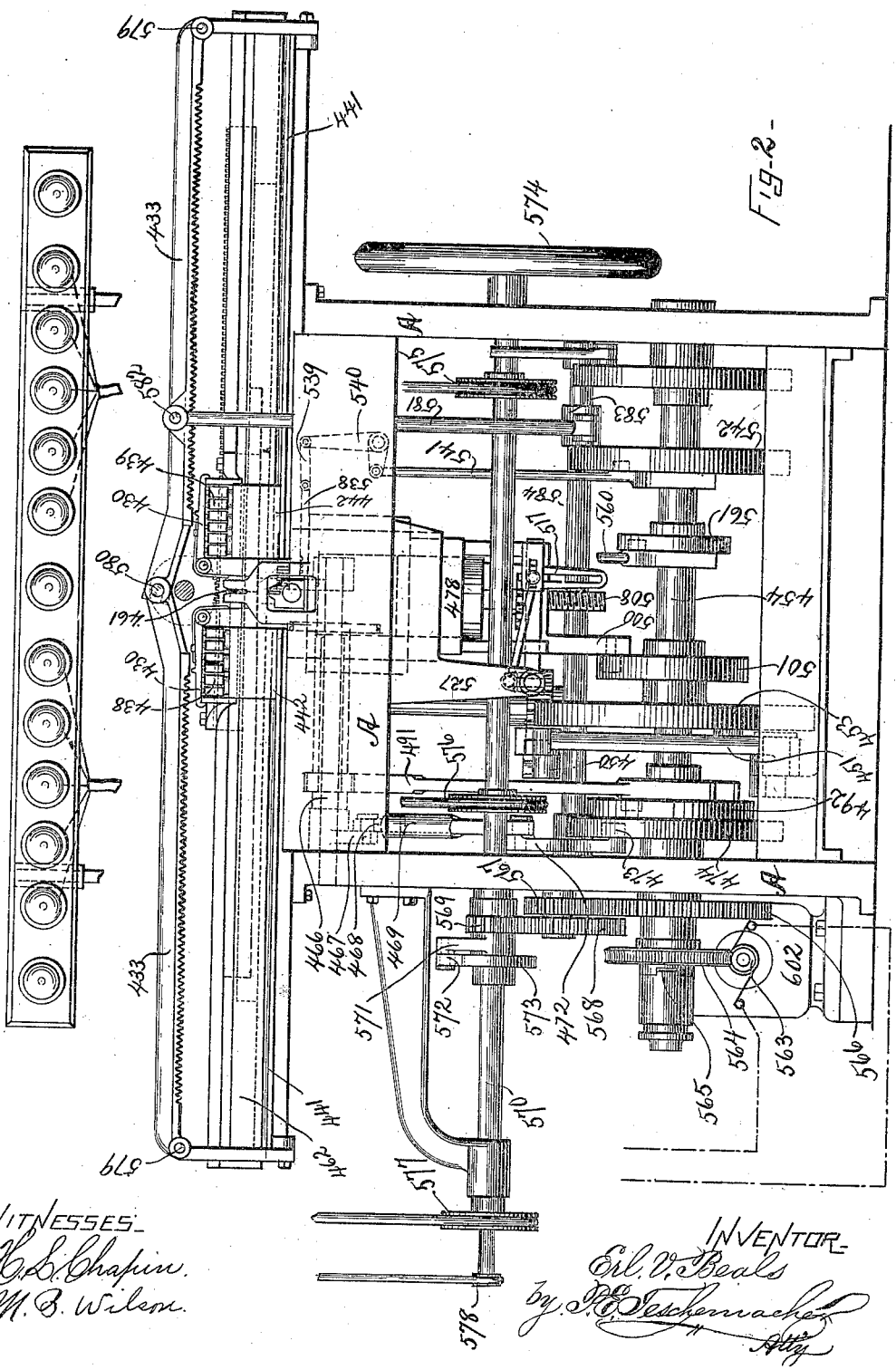

In the accompanying drawings, Figure 1 is an end elevation of my improved machine for producing printing-bars. Fig. 2 is a front elevation of the same, some of its parts being removed to better illustrate the operation of the matrix-strips. Fig. 3 is a plan view with some of its parts removed to show the multiple finger-board mechanisms and their connections with the matrix-strip-assembling mechanism. Fig. 4 is a plan of the series of matrix-strips detached, illustrating the manner in which they slide past each other when operated by the assembling mechanism. Fig. 5 is a detail of the matrix-strips on the line 5 5 of Fig. 4, showing the matrices assembled at a common transverse casting-line. Fig. 6 is a front elevation of the matrix-strips, their operating-magnets mounted upon carriages, the hooked armatures pivoted to the matrix-strips, and the grooved plates for locking said matrix-strips. Figs. 7, 8, and 9 are details of the casting mechanism. Figs. 10, 11, 12, 13, 14, and 15 are details illustrating the construction of the valve of the melting-pot and the mechanism by which the printing-bar blank or slug is introduced into the throat of the valve and ejected therefrom. Figs. 16, 17, and 18 are views of the three-part galley for receiving the finished printing-bars, illustrating the manner in which the bars produced by each operator are assembled and kept separate from those produced by the other operators. Fig. 19 is a diagram of the electrical connections between the several finger-board mechanisms and the matrix-strip-assembling mechanism. Figs. 20 and 21 are respectively an end elevation and a section of the circuit-interrupting device for automatically preventing the interference of one finger-board mechanism with the others in their control of the general matrix-strip-assembling mechanism. Fig. 22 is a plan of the composing mechanism, showing one line-composing device complete and portions of the adjacent ones. Fig. 23 is a front elevation of the same. Fig. 24 is an end elevation of the same. Figs. 25, 26, 27, and 28 are perspective detail views of the line-composing mechanism. Figs. 29, 30, 31, 32, 33, and 34 are views illustrating the construction of the justifying mechanism which coöperates with the composing mechanism to produce the justification of a line; Figs. 35, 36, 37, 38, 39, and 40, details to be referred to. Fig. 41 is a perspective view of the slug or prepared blank. Fig. 42 is a perspective view of the printing-bar complete.

Referring to the drawings, A represents the framework of the machine, which may be of any suitable form and construction to adapt it to support the operative parts hereinafter described.

425 represents a series of horizontally-arranged sliding matrix-strips, which are supported on a table 426, which forms a guideway for the same. The table 426 is provided at its front and rear edges with ledges 462 and 463, the space between which is occupied by the matrix-strips and their clamping mechanism, and in this table, midway between the ends, is formed an opening 427, Figs. 7, 11, and 12, for a purpose to be hereinafter described.

The matrix-strips are tapered from end to end and are arranged with their thin ends extending alternately in opposite directions, their thick ends normally lapping each other over the transverse opening 427 in the table 426, as shown in Fig. 3. These strips are designed to slide longitudinally past each other, each strip moving in a direction opposite to that of the strips next adjacent thereto. Each strip is provided at its lower edge with a series of rectangular indentations 428, the inner surfaces of which are provided with intaglio characters. Each strip is provided with all the characters used in printing, said characters being arranged in the order of their width, the narrowest characters being at the thin end of the strip. The characters are sunk in the bottoms of the transverse indentations 428 in such manner that they will stand properly side by side in a line transverse of the series of matrix-strips, as shown in Fig. 5. The upper edge of each strip is provided with a series of notches arranged directly over the indentations of the lower edge, said notches being designed to receive an alining-blade to be hereinafter described.

At the thick end of each matrix-strip is a projection 429, to the outer end of which is pivoted an arm 430, having at its outer end a hook 431 and on its upper edge a projection 432, which is adapted to engage the transversely-grooved surface of one of a pair of hinged plates 433, located thereover, whereby said strip is temporarily held in position before being clamped for the casting operation. These plates 433 are hinged at their outer ends at 579 to upright supports at the ends of the table 426 and are connected together at 580 by a pin on the one fitting in a slot in the other, said plates being raised and lowered together by a rod 581, pivoted to one side of one of the plates at 582, the other end of said rod being pivoted to an arm 583, rocking on a stay-rod 584, said arm 583 carrying a roll engaging a groove in a cam-wheel 542 on the main cam-shaft 454. Secured to each projection 429 is a spring 434, the upper end of which is slidingly connected with the arm 430, pivoted to said projection, and tends to raise the arm as far as permitted by its tailpiece 435, which contacts with the edge of the projection 429, which forms a stop therefor.

On carriages 436 437, sliding in suitable guides, are mounted two sets of magnets 438 and 439, said carriages, which are located over the matrix-strips, moving longitudinally and simultaneously in opposite directions with respect to each other and being each provided with a transverse bar 440, over which catch the hooks 431 of the pivoted arms 430 when the carriages are at the limit of their inward movements, said arms constituting the armatures of said magnets.

In the front side of the table 426 is formed a groove 441, in which slides a tongue 442 on the downwardly-extending portion of each of the carriages 436 437. The rear edges of the carriages are secured to rack-bars 443 and 444, which slide in suitable guideways formed in the table 426, the carriage 437 being secured to the rack-bar 444 and the carriage 436 to the rack-bar 443, said rack-bars having teeth on the rear side and the rack-bar 443 being also provided with teeth on its upper surface for a purpose to be hereinafter described. Meshing with these rack-bars are two horizontal gears 445 and 446 of the same diameter, which also mesh with each other, the gear 445, which meshes with the rack 443, being secured to the upper end of a vertical shaft 447, supported in suitable bearings, and the gear 446, which meshes with the rack 444, rotating on a stud on the frame A. To the lower end of the shaft 447 is secured another gear 448, which is engaged by a horizontal rack 449, sliding in a guideway secured to the frame and having pivoted to its front end a link 450, the outer end of which is pivoted to one arm of a bell-crank lever 451, fulcrumed at 452, the other arm of said lever carrying a cam-roll engaging a groove in the side of a cam-wheel 453, secured to the main horizontal cam-shaft 454, which is journaled in suitable bearings in the frame A, and thus, through the connections described, as the cam-wheel is revolved the carriages are reciprocated synchronously in opposite directions for a purpose which will now be described.

When the carriages are at the limit of their inward movements, the tapered matrix-strips are all in their extreme outward positions, (shown in Fig. 3,) and as the carriages are moved outwardly away from each other they carry with them the matrix-strips temporarily connected therewith, those strips on the right being moved in the direction of the arrow 455 by the carriage 436 and those on the left in the direction of the arrow 456 by the carriage 437.

The carriages are enabled to actuate the strips, as above stated, by reason of the arms 430 engaging the transverse bars 440, the hooked ends of said arms 430 being held down in engagement with said bars by the magnets 438 and 439 acting upon the armature-arms 430, as shown in Fig. 2. It will be understood that the projections 429 of the matrix-strips on the right-hand side are located on the left-hand side of the center transverse assembling or casting line, said projections never crossing said line, and that the projections 429 of the matrix-strips on the left-hand side are located on the right-hand side of said assembling-line and never pass to the left of said line. During the movement of the carriages away from each other the magnets of the two sets mounted thereon, which have been holding down the hooked armature-arms 430, as described, are demagnetized successively or simultaneously, as the case may be, by the breaking of the individual circuits in which they are included, said breaking being effected by mechanism to be hereinafter described. As each magnet is demagnetized its particular arm 430 is thrown up by its spring 434 disengaging the hook 431 from the bar 440 and at the same time causing the projection 432 of said arm to engage one of the notches of the hinged plate 433 thereover, thus instantly arresting the movement of the particular matrix-strip to which said arm is pivoted and simultaneously locking said strip in said arrested position, with one of its series of intaglio characters in the transverse casting-line. It will thus be seen that the particular character brought into the transverse casting-line will depend upon the longitudinal position in which the matrix-strip is stopped by the means described. What is true of one matrix-strip applies to the entire series, which are all moved by said carriages, and such ones released and locked in such position or positions as may be required during a single outward movement of said carriages, an example of the relative positions of said strips at the conclusion of an outward movement of said carriages being shown in Fig. 4, the desired characters being assembled in the transverse casting-line, as shown in Fig. 5.

457 is an alining-blade which is pivoted at 458, and at the conclusion of the outward movement of the carriages is actuated by mechanism to be hereinafter described to cause it to engage the notches 459 of the matrix-strips and produce an accurate alinement of the intaglio characters on said strips, as shown in Figs. 5 and 6, the locking of the strips by the engagement of the projections 432 with the transverse grooves of the hinged plates 433 having only approximately effected this alinement. This alining-blade 457 is guided in a transverse slot 461, formed in an anvil 460, projecting over the matrix-strips at the assembling-line, said anvil affording a rigid bearing against which the matrix-strips are forced to insure the bottoms of the intaglio characters at the assembling-line being all in the same plane. While the matrix-strips are being alined, as described, they are being tightly clamped together by mechanism which will now be described.

Between the rear matrix-strip and the rear ledge 463 of the table 426 is a long clamping-bar 464, which slides on said table transversely of the same. To this bar 464, at the center of its length, is secured a rack-bar 465, which projects rearwardly and is engaged by a sector-arm 465ª, secured to a rock-shaft 466, supported in bearings in the frame, said shaft being provided with a crank-arm 467, to which is pivoted a rod 468, which slides within a tubular connecting-piece 469 against the end of a coiled spring 470, said rod 468 being held in place by a transverse pin 471, arranged to slide in slots in said tubular piece 469, to the lower end of which is pivoted one arm of a bell-crank lever 472, the opposite end of which carries a cam-roll 473, which engages a cam-groove in a cam-wheel 474 on the cam-shaft 454, said cam-wheel being properly timed to cause the clamping-bar to advance and clamp the matrix-strips in their alined position during the operation of casting the printing-bar and then recede to release said matrix-strips at the termination of said operation. As the aggregate width of the matrix-strips at the transverse casting-line is constantly varying by reason of the matrix-strips being drawn out more or less by the carriages, it follows that the clamping-bar will be brought into contact with the strips sooner or later in its inward movement, the variation in motion being taken up by the spring 470, which is of such strength as to cause the clamping-bar to exert a sufficient yielding pressure against the series of matrix-strips to keep them tightly in contact with each other as required. Since the total number of letters in a line of given length varies according to the thicknesses of said letters, it follows that the number of matrix-strips assembled to form such line will vary likewise, as will also the number of unused matrix-strips.

Those matrix-strips which go to make up a line when properly justified, as will be hereinafter described, always occupy the same lateral space at the casting-line, but the lateral space occupied by the unused matrix-strips at said casting-line will vary according to the number of such strips. Hence the necessity of providing a clamping device having a variable movement.

At the same time that the matrix-strips are clamped, as desired, the alining-blade 457 is caused to engage the notches 459 of the whole series of matrix-strips, to accomplish which an arm 475, Fig. 8, connected with the pivot 458 of the alining-blade, is thrust outward by the action of an oblique cam-groove 476 on a roll at the lower end of the arm 475, said cam-groove being formed in an arm 477, projecting from the melting-pot 478, which is moved vertically, as will be hereinafter described.

*Casting mechanism.*—Having described the mechanism for assembling, alining, and clamping the matrix-strips, it now remains to describe the mechanism by which the printing-bars are produced from the transverse line of assembled matrices. In obtaining these printing-bars I preferably employ previously-prepared blanks or bases 479, upon the edges of which the printing-faces 480 are to be cast. The blank, Fig. 41, is composed of any suitable material—for example, hard metal—upon one edge of which is to be cast or molded in the present machine an edge portion of soft metal or other suitable substance designed to bear upon its face the printing-letters required for an entire line. One longitudinal edge of the blank is provided with notches, into which fit correspondingly-shaped apertured projections or nipples 544 at the top of the melting-pot 478. Extending through the blank in the direction of its width from the bottom of said notches to its opposite edge is a series of holes which register with the corresponding ports 494 of the discharge-valve of the melting-pot, these holes forming the passage-ways for the molten metal to pass into the molding-chamber formed between the edge of the blank and the line of matrices. Near one end of the blank is formed an additional passage-way, which communicates with the longitudinal groove in the edge of the blank and extends down into one of the said notches, said opening forming a vent for the escape of air from the molding-chamber as the molten metal enters the same. These blanks are adapted to be fed one at a time to the casting-line, each blank having at its ends suitable notches 481, adapted to engage longitudinal guide-rails 482, secured to the under side of the table 426, as shown in Figs. 1, 8, and 10. These blanks so held are constantly pushed or fed forward by a spring-actuated follower 483, Fig. 10, to bring the foremost one against a movable stop 484, forming the movable part of the mouthpiece of the discharge-valve of the melting-pot 478. The stop 484, Figs. 10, 11, 12, 14, and 15, is arranged to slide vertically in a dovetailed way 485, secured to a rack-bar 486, which slides horizontally in a grooved bracket 487 on the under side of the table 426, said rack-bar receiving motion from a gear 488 on a sleeve 489, mounted on a shaft 466, previously referred to. To the sleeve 489 is secured another gear 490, which is engaged by a rack-bar 491, the lower end of which is forked to embrace the cam-shaft 454 and is provided with a cam-roll, (shown dotted in Figs. 2 and 8,) which lies within the groove of a cam-wheel 492, the curves of which are not shown, but are adapted to produce at proper intervals two consecutive forward movements of the rack-bar 486, and thus through the connections described as the said wheel is rotated the rack-bar 486 is reciprocated carrying with it the stop 484, for a purpose to be presently described. When the rack-bar is moved in the direction of the arrow, Fig. 10, the foremost blank is carried forward with said bar by the engagement therewith of the projections 495 with the notches in the ends of the blank, the notches and projections being shown in Fig. 15, this movement placing said blank over the ports 494 of the discharge-valve of the melting-pot, as shown in detail in Figs. 11, 12, and 13. During this forward movement the rear portion or tailpiece of a guard-block 493, which is secured to said rack-bar 486, as shown in Fig. 10, slides in contact with the next printing-bar blank, thus forming a stop for retaining the entire row of blanks in place, and as soon as the guard-block in its backward movement clears the row of blanks the spring-actuated follower 483 forces the entire row forward, bringing the foremost one into contact with the stop 484, when the projections 495 are brought in line with the guide-rails 482, which enter the notches 481 of the blank and serve to securely support it during its subsequent movements, it being understood that the guide-rails 482 terminate at the edge of the horizontal path of travel of the foremost blank and close to the said projections 495. As the blank is moved forward with the stop 484, which constitutes the movable part of the mouthpiece of the melting-pot, it is slid against the stationary portion 496 of said mouthpiece, thus occupying a position between the two portions of said mouthpiece, as shown in Figs. 11 and 12. The stationary portion 496 of the mouthpiece projects upwardly from the valve-casing 497, which latter is integral with the melting-pot 478, on the front side of which is formed a dovetailed projection 498, which slides vertically in a guideway 499 on the framework A. (Shown in Fig. 10.)

At one side of the bottom of the melting-pot is formed a projection 500, the lower end of which carries a roll which engages a groove in a cam-wheel 501 on the main cam-shaft 454, whereby as the said cam-wheel is rotated the required vertical movements will be given to the melting-pot for purposes to be hereinafter described. The upper portion of the melting-pot is provided with a main central chamber 502 for containing the molten metal, outside of which are formed two annular chambers 503 and 504, the latter communicating through a passage 505 with the main or central chamber 502. The chamber 504 is intended to receive a supply of metal to be afterward introduced through the passage 505 into the inner central chamber, and within the chamber 503 is placed wire or other suitable material of known electrical resistance, through which is passed an electric current for the purpose of generating heat to melt the metal and maintain it at the proper temperature. The central chamber 502 is closed at the top, and within the lower open end of the melting-pot in line with said chamber 502 is fitted a vertically-sliding plunger 506, provided with suitable packing-rings 507, and adapted to close said chamber at the bottom.

In order to effect the discharge of the molten metal to produce the printing-bar, the plunger 506 is caused to exert a constant pressure on the metal in the central chamber 502 by mechanism which will now be described. Extending up within an open chamber 512 at the lower end of the plunger 506 is a vertical screw-shaft 508, provided with a fixed collar 509, the head 510 of said shaft fitting loosely within a cavity 511 in said plunger and the lower end of said shaft engaging a nut 514, provided on its periphery with ratchet-teeth, said nut being supported on a plate 515, Fig. 9, forming a portion of the lower part of the melting-pot. Encircling the shaft 508 between the collar 509 and the top of the chamber 512 is a coiled spring 513, which exerts a constant upward pressure against the plunger 506 by reason of the screw-shaft 508, which carries the collar 509, being prevented from descending by the ratchet-nut 514, through which its lower end passes. It will be understood that as fast as the metal is discharged from the chamber 502 the plunger 506 will be raised by the spring 513, which would soon cease to exert sufficient pressure on the plunger to cause the metal to be discharged from said chamber 502, and for the purpose of automatically keeping the spring at the required tension I provide a device which will now be described. Pivoted at 516 to a lug projecting from the interior of the plunger 506 is a lever 517, the short forked arm 518 of which embraces the collar 509, the long arm of said lever being provided with a slot 519, in which fits a stud 520, the opposite end of which is squared and slides longitudinally within a slot 521, Figs. 7 and 9, in an angular arm 522, projecting from the bottom of the framework of the melting-pot. On this stud 520 is pivoted a connecting-rod 523, the opposite end of which is pivoted to an arm 524, projecting from a short sleeve 525, rocking upon a stud 526, projecting from a long stationary arm 527, secured to the framework A. One end of this sleeve 525 is provided with a block 528, having a slot in which slides a roller mounted at one end of a horizontal bar 529, which slides in guides in the framework of the melting-pot. On one side of this bar is a lug to which is pivoted a spring-pawl 530, engaging the teeth of the ratchet-toothed nut 514, previously referred to. Thus as the plunger 506 rises during the discharge of the metal, carrying with it the pivot 516, while the collar 509 in the screw-shaft 508 remains stationary, it follows that the lower slotted end of the lever 517 will be moved to the right and through the connections described will turn the block 528, so that its slot will be inclined at an oblique angle, whereby as the bar 529, carried by the melting-pot, is moved up and down therewith a horizontal reciprocating movement will be given to said bar, causing its pawl 530 to actuate the ratchet-toothed nut 514, raising the vertical screw-shaft 508, with its collar 509, and thus restoring to the spring 513 the tension lost by the rise of the plunger 506, resulting from previous discharges of the metal. This automatic device is intended to operate at intervals only, when the tension of the spring has been reduced to such an extent that it will fail to effect a sufficient pressure on the molten metal to produce a perfect printing-bar. After the metal in the central chamber has become exhausted and it becomes necessary to replenish the supply the plunger 506 is drawn down sufficiently to uncover the passage 505, when the molten metal in the annular outer chamber 504 will flow into said chamber 502, after which the outer chamber may be resupplied with metal. The drawing down of the plunger is effected by turning a hand-wheel 531, secured to a short vertical shaft provided at its upper end with a gear 532, which meshes with a gear 533, fastened to the ratchet-toothed nut 514, the rotation of which causes the screw-shaft 508 to descend, carrying with it the plunger 506.

Immediately over the center of the chamber 502 and communicating therewith through a slot 536 is located the rotary valve 534, through which the molten metal is discharged into and through the printing-bar blank, Figs. 11 and 12, to the molding-chamber formed by an alined series of the indentations 428 of the matrix-strips 425, having the required intaglio characters in their bottoms, as previously described. As before mentioned, the molding-chamber is formed by an alined series of indentations in the matrix-strips, as shown in Fig. 5, and the end wall on one side is formed by the front ledge 462 of the table 426, Fig. 8, against which the whole series of matrix-strips are thrust by the clamping-bar 464, while the end wall on the other side is formed either by the clamping-bar 464 itself when all the matrix-strips are employed in forming the line or when less than the whole number of matrix-strips are needed for the characters in the line, then the side of the first matrix-strip not employed for a character becomes the end wall on this side, there being no indentation at the alined point in the matrix-strips not used for characters in said line. This valve, which is of conical shape, as shown in Fig. 8, is provided with a series of openings 535 of different lengths, which as said valve is turned in the direction of the arrow, Fig. 13, are consecutively caused to register with their respective ports 494, so as to permit the molten metal to be injected into the molding-chamber first through the aperture at the end of the blank opposite to the end which is provided with the small air-aperture, and thence successively through the other apertures in the order of their distance from the said first aperture, until finally the metal having filled the mold fills up said air-aperture also, at which time the further revolving of the valve closes the air-aperture also, the purpose of admitting the metal into the mold consecutively through the openings of the blank being to drive out the air in advance of the metal as it fills up the mold. The valve is provided at one end with a gear 537, with which meshes a rack-bar 538, which slides in suitable bearings on the top of the melting-pot, said rack having pivoted to its outer end a link 539, Fig. 2, pivoted at its opposite end to one arm of a bell-crank lever 540 fulcrumed in the frame A, the other arm of said lever 540 being pivoted to a connecting-rod 541, the lower end of which is forked to embrace the main cam-shaft 454 and carries a roll engaging a groove in the side of a cam-wheel 542 on said cam-shaft, and thus through the connections described the valve is oscillated at the proper times to open and close the ports 494 to permit and cut off the flow of the metal. I have already described the mechanism by which the printing-bar blank is taken from the row of blanks between the guide-rails 482 and deposited over the ports 494 between the movable and stationary portions 484 and 496 of the mouthpiece, as shown in Fig. 11, the blank being held firmly between said two portions, with the notches 481 engaging the projections 495 of the movable piece 484, said projections being shown in Fig. 15. The parts being in the position shown in Fig. 11, the melting-pot is raised by the cam 501, as already described, which causes the two portions of the mouthpiece to enter the tapered opening 427 in the table 426. As the melting-pot is raised the part 496 of the mouthpiece rises until its upper end is even with that of the movable portion 484, when both parts of the mouthpiece continue to travel together until their upper ends strike the table 426, when the two parts of the mouthpiece become wedged toward each other by the inclined sides of the opening 427 acting on their tapered ends, thus clamping the blank 479 between them, as well as causing it to be firmly seated over the ports 494, the parts then being in the position shown in Fig. 12. I preferably terminate the ports 494 in nipples 544, which enter corresponding indentations in the lower edges of the blank. The parts being in the position shown in Fig. 12, the valve 534 is turned and the metal admitted to the molding-chamber 545, after which the cam 501 draws down the melting-pot, when the parts will again assume the position shown in Fig. 11, after which the rack-bar 486, to which is attached the movable portion 484 carrying the completed printing-bar, is given a further movement to the left by its operating-cam 492, until the forward end of the printing-bar engages the tapered end of a stationary bar 546, which forces said printing-bar out of engagement with the projections 495, as shown in Fig. 15, when said printing-bar slides down an inclined chute 547 into its proper galley, as will now be described.

As there are three finger-boards in the machine here represented, there must be three separate and distinct receiving-galleys, one for the printing-bars produced by each operator, said galleys forming a single multiplex galley. These galleys 548, 549, and 550 (shown in Figs. 16 and 17) are removable and are arranged side by side in a common plane, separated by suitable partitions 551, which form ways in which said galleys slide and from which they are removed when filled and replaced by others. These galleys are arranged at right angles to the inclined chute 547, with their open ends in communication therewith. At the lower end of the chutes 547 is a fixed stop 552, by which the printing-bar dropping down through said chute is arrested in a position opposite to the mouth of the lower galley, if its course is not previously interrupted by one of the movable stops 553 554, which are located opposite to the lower edges of the galleys 548 and 549. These movable stops consist of bell-crank levers pivoted to lugs 555, projecting from the galley-support, and are automatically operated at the required times by devices forming a portion of the composing mechanism, to be hereinafter described. It should be understood that when a printing-bar is to be placed within the lowermost galley 550 neither of the movable stops 553 or 554 is advanced, leaving the chute clear for the full descent of the printing-bar. If the printing-bar is to be deposited in the middle galley 549, the stop 554 will be advanced, thus arresting the bar opposite to said galley, and if the printing-bar is to be deposited in the topmost galley 548 the stop 553 is advanced to arrest the bar opposite to the open end of said upper galley.

Having described the manner in which the printing-bars are arrested opposite to their proper galleys, it remains to show how they are introduced within the same. To arms 556 on a rock-shaft 557, supported in bearings on the galley-support, is secured a long flat bar 558, forming a portion of one side of the chute 547 and extending across the front ends of the galleys. To a crank-arm 559 on the shaft 557 is pivoted a rod 560, the opposite forked end of which embraces the cam-shaft 454, Fig. 2, and carries a cam-roll engaging a groove in a cam-wheel 561 on said shaft, whereby the shaft 557 is rocked to advance the bar 558, which thus pushes the printing-bar from its stopped position in the chute 547 into its proper galley, the lower edge of the bar 558 at the same time acting on the inclined end of either one of the movable stops 553 554 which may have been advanced, forcing it down out of the way to leave the chute unobstructed, ready for the passage of the next printing-bar to any one of the three galleys in which it may be desired to place it.

*Driving mechanism.*—Motion is communicated to the machine by an electric motor 602, secured to the framework A, Figs. 1 and 2, a worm 563, Figs. 1 and 2, on the shaft of which motor engages a worm-gear 564, loosely mounted on the main cam-shaft 454. The hub of this worm-gear forms one member of a clutch 565, the other member being splined to said cam-shaft and capable of being connected or disconnected at will by hand. On the shaft 454 is secured a gear 566, which through intermediate gears 567 568 drives a gear 569, loosely mounted on a long shaft 570, the hub of said gear 569 having an arm 571, which carries a spring-pressed pawl 572, Figs. 1 and 2, engaging a notch in a disk 573, secured to the shaft 570. On one end of the shaft 570 is secured a balance-wheel 574, and at intervals throughout its length are secured grooved pulleys 575, 576, and 577, and at the extreme left-hand end of said shaft is a small grooved pulley 578, all of which pulleys are connected by suitable belts with the composing mechanism, which will now be described.

*Multiple composing mechanism.*—At the left-hand upper portion of Fig. 1 is shown the composing mechanism, which also embodies the justifying mechanism, and as these mechanisms are of identically the same construction as those represented and described in my applications for Letters Patent, filed on the 21st day of February, 1898, Nos. 671,170 and 671,171, I will now describe the same only as far as necessary to an understanding of the application of these mechanisms to the matrix-strip-assembling and line-casting devices hereinbefore fully described.

My composing mechanism comprises a series of independent finger-boards all coöperatively connected together and each operating in any sequence of turns the hereinbefore fully described matrix-strip-assembling and casting mechanisms. The number of finger-boards herein shown is three; but a greater number may be employed, three being sufficient to fully illustrate the general construction and organization of the machine.

Each operator works independently of his neighbors on different matter and with such intervals of action and inaction as he may choose—in fact, just as if he were the only operator at work on a single-keyboard machine. It should be understood that each composing mechanism of the series is connected directly with the automatic assembling and casting mechanism hereinbefore referred to only for from one to three seconds at a time, means being provided by which are prevented any possible interferences, such as would occur if two or more operators should happen to complete their lines at exactly the same time and then simultaneously attempt to effect the casting of their printing-bars.

In the following description since all of the finger-boards are alike only one will be described and afterward their joint arrangement.

200 represents the base of the multiple composing mechanism, which is supported on two arms 585, forming a portion of the main frame A, from which base rise two arms 201 and 202.

203 is a horizontal shaft, one end of which is journaled in the arm 201, its opposite end being supported in a bearing 204, formed at the center of one head 205 of a magnet-supporting casing or shell 206. At one end of the shaft 203 is a pulley 207, over which passes a small belt by which it is rotated at a high speed. Over an enlarged portion of the shaft 203 are arranged to slide laterally and rotate freely thereon a series of thin rings 209, as shown in Figs. 25 and 26, each provided with a long lug 52 and also with other shorter lugs of various lengths for justifying purposes, as will be hereinafter described. Each ring is provided on its inner periphery with teeth, which as said ring is moved laterally along the shaft 203 engage longitudinal ribs 211 on a sleeve 212, supported on the shaft 203, as shown in Figs. 22 and 23, said sleeve carrying a gear 213, with which meshes a smaller gear 214, secured to a long shaft 215, extending lengthwise of the mechanism and connected by suitable gears 216 217 with a shaft 218, Fig. 3, receiving motion through the bevel-gears 589 and 588, the shaft 587, and the rack 443, as hereinafter fully described, in such manner that it will intermittently revolve in one direction and then in the opposite direction. The right-hand end of the sleeve 212 fits closely against a shoulder on the shaft 203, formed by the enlarged portion of the same, the diameter of said sleeve being the same as that of said enlarged portion. The sleeve 212 is held in a fixed position by a spring locking device 219, fastened to the projection 201 and acting by entering a notch 222 to lock the gear 213, to which the sleeve is fastened, as shown in Fig. 40. The entire series of rings 209 is embraced by two collars 220, forming part of a yoke 221, secured to an escapement-bar C, as shown in Figs. 1 and 22. To the left-hand end of the bar is secured a cord 223, passing over guide-pulleys and having its other end fastened to a long coiled spring 224, which serves to draw the said escapement-bar to the left, as permitted by a vibrating magnet-actuated pawl 225. All of the rings 209 being upon the enlarged portion of the revolving shaft 203, as shown in Fig. 23, they would revolve with said shaft if not prevented by a sliding stop-bar 226, with which the long lugs 52 are brought into contact, as shown in Fig. 25. This sliding stop-bar 226 when in its normal position, as shown, permits the revolving of three of the rings 209 with said shaft, such revolution being insured by a spring-pressed block 227, inserted within the shaft 203, as shown in Figs. 23 and 27, and designed to produce a frictional contact with the interior periphery of said rings, as clearly shown in Fig. 23.

*The composing-magnets.*—The shell or casing 206 encircles the enlarged portion of the shaft 203 and the rings upon the same, and arranged around the outside of this casing are as many magnets 228 as there are different characters used in printing. These magnets are arranged in rows one behind the other, so that their centers will be in different radial positions. Secured to the armature of each magnet is a rod 229, the left-hand end of which passes through a flange 232, forming the left-hand end of the casing 206, and is connected with one of a series of pivoted stop-arms 230, the other end of said rod passing through the head 205 and being connected with one of a series of similar arms 231, pivoted at its outer end in said head. The arms 230 are arranged radially around the flange 232, being supported in grooves 233 234 in rims formed on the outer face of said flange, and the arms 231 are arranged radially around the head 205 in a manner similar to the arms 230 and designed for a purpose to be hereinafter described. The inner ends of the arms 230 are normally held by springs 235 out of the plane of travel of the first of the three rings 209, which revolve with the shaft 203, and when the inner end of any one of the arms 230 is drawn inward to the bottom of its groove 234 by the action of its particular magnet 228, to the armature of which its rod 229 is attached, it is placed in the path of travel of the first of the three revolving rings only to intercept the long lugs 52, thereby arresting the rotation of this ring with the said lug 52 in a radial position determined by the radial position of the stop-arm 230, which was drawn in to intercept it, the frictional contact of the spring-pressed block 227 in the revolving shaft 203 keeping said lug 52 in contact with said stop-arm, as shown in Fig. 25. Each of these magnets 228 is electrically connected with only one of the composing-keys 236 of one of the three finger-boards X Y Z, the keys thereof controlling the radial positions in which the long lugs of the several rings are stopped, since there are as many magnets as keys and radial arms as there are magnets.

*Threading the composed rings.*—As a composing-key is released after having been depressed to stop a ring, as desired, the whole series of rings 209 is moved to the left by the action of the spring 224 on the escapement-bar C, attached to the yoke 221, a distance limited by said escapement-bar in a manner to be hereinafter described, which lateral movement of the rings causes the ring last set or stopped to be forced off from the enlarged portion of the shaft 203 onto the stationary sleeve 212, the teeth of said rings engaging the ribs 211 of said sleeve as it is threaded thereupon, and so on with each of the other rings in succession until they are all threaded onto the stationary sleeve 212, except as will hereinafter be explained. The body of the casing or shell 206, together with its flange 232, instead of being a complete circle is provided with an opening 237, as shown in Fig. 24, to permit of the passage of the yoke 221, which slides the rings on the revolving shaft 203, and the flange 232 is provided at its periphery with an annular cap 238, which projects over the pivoted ends of the arms 230 to hold them in the grooves 233, in which they are pivoted. The pivoted arms 231, which are arranged radially around the head 205, similarly to the arms 230 on the flange 232, are likewise held in place by an annular flange 239, similar to the flange 238, said arms being designed to control the registering device, referred to hereinafter, for determining the length of the line as it is composed.

*The keyboard.*—Leading from a battery 251, Fig. 22, is a wire 252, which is electrically connected alike with all of the magnets 228, and leading from said magnets is a series of insulated wires, preferably laid together and forming a cable 240, there being in this cable one insulated wire from each magnet. This cable leads to one of the finger-boards Y, for example, its wires being spread out and communicating one with each composing-key in the manner shown in Fig. 24, which will now be described. A series of bars 241, composed of non-conducting material, extend in parallel rows under the series of rows of composing-keys of the keyboard. Each bar has secured to it on one side a series of separate spring contact-strips 242, insulated from each other by said bar and each having one of the wires of the cable 240 attached thereto. To the opposite side of each bar 241 is secured a second series of spring-strips 243, all connected together at their lower ends, forming a single piece, to which is attached a single wire 248, the wires from several pieces converging to and being connected with a single wire 249, which leads to the magnet 250, which operates the vibrating escapement-pawl 225, before referred to, the current thence passing by the wire 249 to a suitable device S of known electrical resistance, from which it returns to the battery 251 by the continuation of the wire 249. Between the upper ends of the strips 242 and 243 is a tapered block secured to the lower end of a composing-key stem, said block being composed of a lower section 245, of non-conducting material, and an upper section 246, formed of a conducting material, whereby when the key is held in its normal raised position by its spring 247 the non-conducting section 245 only will be between the upper ends of the strips 242 and 243, thus interrupting or breaking the circuit at that point. On the depression of a key the conducting-section 246 will be interposed between the ends of the two strips, thus completing the circuit to energize the particular magnet 228 connected therewith.

262 is a soft-rubber buffer for cushioning the downward stroke of the key.

The escapement-magnet 250 is mounted on a supporting-bracket 253, Fig. 24, and its armature having secured to it the escapement-pawl 225, which is pivoted to the upper end of a projection on the said bracket. The vibrating end of this pawl is adapted to engage alternately two rows of ratchet-teeth 254 and 255, slidingly coupled together, whereby the escapement-bar C is given a step-by-step movement by the spring 224 in a well-known manner, a spring 255' being interposed between the slides 254 and 255, which spring serves to push forward the slide 255 as far as the pin 254' in the slide 254 will permit, a slot 256' being provided in the slide 255 for the play of said pin 254'.

256 is the space-key lever, pivoted at 257 and having connected therewith a rod 258, Figs. 22 and 30, the upper end of which is pivoted to an arm 259 on a rock-shaft 60, which actuates the justifying mechanism, to be hereinafter referred to. The space-key lever is provided near its outer end with a forked projection 261, which embraces the stem of a space-composing key, which is designed to produce a space instead of a character, said key making and breaking, in the same manner as described for the composing-keys, a circuit controlling a particular stop-arm 230, which is designed to stop any ring 209 of the series with its longest lug in such a radial position as will produce along with the printing characters the thinnest spaces which it is intended to place between the words of a composed line.

*The coöperative drum of combinations.*— To enable the operator to know at diverse times during the composition of a line what portion of a line remains to be filled, I provide a registering device to point it out on a scale or indicator. This device is provided with a pointer H, Figs. 31, 32, and 33, which is attached to a rack-bar 264, operated by a gear 265 on a shaft 399, to the opposite end of which is secured a worm-gear 267, meshing with a worm 268, which is fitted over the reduced end 270 of the fast-revolving shaft 203, Fig. 25. Through this mechanism variable motion is transmitted to the pointer H upon the depression of each composing-key in a manner fully shown and described in my application for Letters Patent filed February 21, 1898, No. 671,170. Coöperating with this registering device is a cylinder 301, mounted to slide longitudinally on a shaft 300, which shaft runs in bearings in suitable supports, (shown in Figs. 31, 32, and 33,) and on the end of which shaft is a grooved collar 302, which is embraced by a forked arm 303, which is secured to the escapement rack-bar C, which rack-bar is traveling from right to left during the composition of a line, carrying with it the cylinder 301 an equal distance for each letter struck no matter what its character may be. The pointer H is attached to the rack-bar 264, as before stated, which bar moves in guideways in the supporting-arms of the shaft 300, said pointer being thus permitted to travel in a path parallel to that of the cylinder 301, but in the opposite direction, so that they travel toward each other. At the beginning of a line the pointer starts from a position 304 (shown in Fig. 31) and the cylinder 301 starts from a position 305, and as each composing-key is struck the escapement-bar C of course moves and carries with it the cylinder 301 a certain fixed distance at the same time the pointer H travels toward it in varying distances according to the character composed, the cylinder moving a definite distance and the pointer a varying distance. Lengthwise of the cylinder 301 and beginning at the outer edge are formed twenty-four divisional lines, each division representing a unit of measure, the lateral extent of which exists a certain number of times or fractions thereof in each character to be assembled. The distance from the outer or zero edge of the cylinder 301 to the starting-point 304 of the pointer H is a fixed number of these units of measure—for instance, one hundred and eighteen—which represents the predetermined length of a composed line. Now as the cylinder and pointer approach each other it will be understood that when the pointer reaches the zero edge of the cylinder 301 the line is full, since the movement of the cylinder 301 recorded a definite part of the thickness of each character to be assembled and the movement of the pointer recorded all that varying part of each character in excess of what was recorded by the cylinder, and any time before the pointer reaches said edge after having passed the first edge it will indicate on the divisional lines of said cylinder the unfilled portion of the line in units of measure not exceeding twenty-four in number. A suitable alarm or signal device 306 is provided, which will give notice to the operator when the pointer has reached the first edge of the cylinder. I preferably use a colored incandescent lamp, which is lighted by closing a circuit when the two contact-points 306$^a$ 306$^b$, Fig. 23, one secured to the pointer H and the other to the arm 303, which slides the cylinder 301 on its shaft, come together.

*The delivery of the set rings.*—After the operator has reached the end of a line, as indicated by the registering pointer just described, all of the lug-bearing rings, including such at the right-hand end of the series as it may not have been found necessary to use in said line, are carried over to the left until they are stopped by the shoulder 319 on the sleeve 212, where they will be in the proper position so that their lugs will contact with the proper circuit-breakers when the cylinder is revolved, as will be described. This is effected by the spring 224 acting on the yoke attached to the escapement-bar C, which is released by raising the magnet-pawl 225 entirely clear of the teeth of said bar, which releasing is effected by the operator in the following manner: Over the shaft 320 of the gear 307, Fig. 35, which shaft is supported in suitable bearings in the frame, is fitted a long splined sleeve 321, provided at its outer end with a hand-wheel 322 and having a longitudinal movement on said shaft and prevented from slipping off the same by a head 323 thereon. This sleeve is adapted to be pushed in by the operator against the resistance of a spring 324 to act on the lower arm of a sleeve 325, mounted on a vertical stud and having an upper arm which engages a horizontal slide 326, supported in suitable guides on a slideway 327 of the escapement-bar. The slide 326 is provided with a projecting arm 328, which engages a notch in the end of an arm 329, projecting from the sliding stop-bar 226, the inner edge of which, as before stated, acts as a common stop for all the lug-bearing rings except three before said rings are set by the composing-keys. In the slide 326 is formed a rectangular slot or opening 332, Figs. 38 and 39, through which extends the vibrating end of the magnet-pawl 225, said opening being enlarged at its right-hand end, forming a shoulder 333. The magnet-pawl 225 normally lies within the narrower portion of the slot, as shown in Fig. 38, which serves to keep it in engagement with the escapement-bar; but when the slide 326 is moved to the left by the means described the wider portion of the slot 332 is brought over the magnet-pawl, which is then forced entirely out of engagement with the escapement-bar by its spring 331, as shown in Fig. 39, and thus the escapement is free to be drawn by the coiled spring 224 to the end of its traverse in that direction. When the rings are automatically returned to the right for the beginning of a new line, as will be described, a projection 334 on the escapement-bar C contacts with an angular projection on a spring-pressed pivoted arm 335, which acts on the vibrating end of the magnet-pawl 225 to force it down into engagement with the teeth of the escapement-bar C, after which the slide 326 is free to be moved to the right by the spring 330, bringing the parts again into position shown in Fig. 38 and keeping the magnet-pawl from springing out of engagement with the escapement-bars.

*The correcting of errors.*—In order to enable the operator to discover any errors and make corrections thereof during the composing of a line, I provide the periphery of each of the lug-bearing rings with all the different characters used in printing, and as the rings are set such of these characters as are to appear in the composed line are brought side by side in a common line to be read transversely of the rings. Now if the operator discovers a wrong letter on one of the rings, as shown in this line, he releases the escapement-bar C from the magnet-pawl 225 by pressing in the hand-wheel 322, as already described, retaining his hand on said wheel, by the turning of which he rotates the splined shaft 320 and through its connections with the escapement-bar C brings back the entire series of rings in the yoke 221, which, as before stated, is connected with the escapement-bar until the particular misset ring is again brought into the intercepting plane of the stop-arms 230, where the said ring is reset to bring its lug in the proper radial position in the regular manner, as has been described, after which the operator proceeds to complete the composition of the line.

*The justifying mechanism.*—The line having been composed, it now remains to justify the same, which is accomplished by a justifying mechanism, Figs. 26, 29, 30, and 31. This mechanism forms the subject of a separate application for patent filed by me February 21, 1898, Serial No. 671,171, and will therefore be only sufficiently described herein to illustrate the manner in which it coöperates with the composing mechanism.

At the beginning of the composed line a traveling splined arm 67 stands under the first one of a series of pivoted sliding plunger-bars 70, and after the first character-key is struck said arm is moved along a rock-shaft 60, Fig. 29, by an escapement rack-bar 69, geared to and receiving an intermittent movement from the main escapement-bar C, so that said arm will be brought successively under plunger-bars 70 until the end of a word is reached, when the space-key 256 is struck, which rocks the shaft 60 and causes the particular plunger-bar which happens to be over said splined arm 67 to be raised, in which raised position it is retained by one of a series of pawls 75 entering a particular one of the three notches on said plunger-bar, depending upon the height to which it was raised. The arm 67 then continues to travel lengthwise of the shaft 60 until the end of the second word is reached, when the space-key is again struck for the second space in a line and a second plunger-bar is raised in the same manner as the first one, and so on until the composition of a line is completed. The plunger-bars are raised three different heights, determined by a check mechanism, (shown in Figs. 32 and 33,) as fully described in my aforesaid separate application for patent, the same order in the raising of the plunger-bars being observed in every line, and coöperating with this check mechanism is a combination-chart, Figs. 31, 32, 33, and 34, and also fully described in my said separate application No. 671,171. This chart is mounted on a cylinder 301, coöperating with the registering device. At the conclusion of the composition of a line the registering-pointer H indicates on this chart a certain combination of three figures, and the operator depresses such of a series of justifying-keys J, Figs. 24, 29, 30, and 31, as bear numbers corresponding to the figures of said combination. These keys act upon swinging pusher-bars 78, 79, and 80, which in turn act upon the arms 77, projecting from the plunger-bars 70, swinging the same forward on their pivots and projecting or thrusting outwardly certain ones of a series of slides 74 which have pivoted at their outer end the circuit-breaking levers B. The slides 74 are thrust forward the same or different distances, which are determined by the particular justifying-keys that are depressed, the particular ones which are thrust out depending on the particular plunger-bars which are raised by the space-key 256. All the plunger-bars which are raised to a certain height cause their corresponding slides to be thrust out an equal distance. The series of slides 74 is located, as shown in Figs. 26 and 30, in front of and close to the sectional lug-bearing ring-cylinder in such manner that the tips 119 of the circuit-breaking levers B, pivoted to said slides, may be struck by the lugs of said rings as they are revolved, and thus cause to be assembled the proper spaces to justify the line, as will be explained in the description of the manner in which the tripping of the circuit-breakers B produces the assembling of characters.

*The revolving of the series of set rings.*— The revolving of the rings is effected in the following manner: When the operator pushes in the hand-wheel 322 to deliver the rings to a fixed position, as described, the tapered block 311, carried by the justifying rack-bar 69, is then advanced in the direction of the arrow, Fig. 23, to the end of its traverse and closes an electric circuit by contacting with the two spring-strips 312 and 313. In this circuit is interposed a magnet 337, the armature of which is attached to the short arm of a lever 338, pivoted at 339 and operating a clutch 340, splined on the shaft 215, which has an intermittent reciprocating movement, as before described, thereby connecting said shaft with the gear 214, the hub of which constitutes the other member of the clutch 340, and thus when the circuit is closed the magnet 337 is energized, and through the connections described the motion of said shaft 215 is communicated to said gear 214 and thence to the sectional ring-cylinder through the gear 213 and its integral sleeve 212, upon which the rings are threaded, the sectional ring-cylinder then making one complete revolution, at which time the motion of the shaft 215 is arrested.

*The breaking of the electric circuits.*—The manner in which the revolving of the rings effects the breaking of the electric circuits is as follows: I is a metallic rotatable cylinder secured to the shaft 215 and insulated therefrom and is interposed in an electric circuit. The ends of the circuit-breakers B are normally in contact with said cylinder I, said levers B being provided at their ends with sectional pieces 355, insulated from the body of the lever, and engaging with these pieces 355 are a series of spring circuit-conducting wires 356, which are insulated from each other and are supported in a suitable support 357, connected with the frame. The conducting-wires 356 converge, as shown in Fig. 26, and are arranged to form a cable 358, to be hereinafter referred to.

359 is an electric brush against the reduced end of the metallic cylinder I and serving to connect said cylinder with a source of electricity, and thus it will be understood that as the levers B are raised out of contact with the periphery of the cylinder I the circuits are broken.

To effect the stopping of the matrix-strips, so as to bring into the transverse casting-line the proper intaglio characters, it is necessary to interrupt at varying intervals of time or simultaneously a series of electric circuits, and this is effected by revolving in the direction of the arrow the sectional lug-bearing ring-cylinder. The lugs in the sectional cylinder are arranged in definite and varying positions by the composing-keys and will strike the tips 119 of the circuit-breaking levers B simultaneously or consecutively and break the circuits accordingly.

For the assembling of the characters only the longest lugs 52 are designed to strike the tips 119, and the slides 74, which control the positions of these tips, remain in their backward position. The different radial positions in which these lugs are set with respect to a fixed point by the composing-keys causes them to travel in their path of revolution a lesser or greater distance before contacting with said tips 119, and consequently the sooner or later will the circuits be broken, resulting in the selection of different characters.

For the assembling of spaces any of the lugs of various lengths are designed to strike the tips 119, and for this purpose the justifying mechanism thrusts out the slides 74 varying distances toward the cylinder, so that they will be acted upon by the shorter lugs, it being understood that the thrusting out of the slides is done after the line has been composed, so that the distances they are thrust out and the corresponding thicknesses of spaces may be determined by the residue or unfilled portion of the line, which residue is to be seen only at the conclusion of the composition thereof. It should be remembered that such of the lug-bearing rings of the series as are intended to produce spaces in any particular composed line are set from the keyboard in the same manner as are the rings which are to produce characters in the line and that said spacer-rings coact to produce the assembled line in the same manner as the character-rings, except that their operation is modified by the intervention of the justifying mechanism, and it will be seen that the set positions of the spacer-rings do not necessarily determine the thicknesses of the spaces finally assembled in the line, but in accordance with the manner in which the positions of the slide coacting with the shorter lugs break the circuits before the longest lugs 52 in their set position can break said circuits, the particular thicknesses of these spaces assembled depending on which one of the shorter lugs is permitted to contact with the tips 119.

*Restoring the rings for a new line.*—Meshing with the teeth on the escapement-bar C is the gear 307, secured to a shaft 320, supported in suitable bearings in the frame and engaging a secondary escapement-bar 69, which serves to operate a part of the justifying mechanism, whereby as the escapement-bar C is moved to the left during the composing of a line the secondary escapement-bar 69 is moved an equal distance in the direction of the arrow, Fig. 23. To the right-hand end of the escapement-bar is secured a block of insulating material 310, to which is affixed a metallic tapered piece 311, designed at the conclusion of each line to enter between two spring-strips 312 313, insulated from each other and included in an electric circuit, the entrance of said tapered piece 311 being adapted to close the electric circuit at this point to energize the magnet 337. The gear 307 meshes with the gear 314, revolving on a stud projecting from the frame, said gear 314 having secured to its side face a beveled gear 315, which meshes with another beveled gear 316, provided with a hub forming one member 341 of a clutch, said gear being loosely mounted between fixed collars on a shaft 317, extending lengthwise of the mechanism. 318 is the other member of the clutch, which is splined on said shaft 317, which is intermittently rotated in opposite directions by suitable connections with the automatic machine, to which the composing mechanism is attached. This member 318 of the clutch is operated by a lever 342, pivoted at 343, the inner end of which is connected by a pin and slot with one end of a connecting-rod 344, the opposite end of which is pivoted to the lever 338, which operates the clutch 340, by which the ring-cylinder is set in motion. When the magnet is energized, as described, and the lever 338 is vibrated on its pivot 339, this clutch member 318 is caused to engage the other member 341 through the lever 342 and the rod 344, connected with said lever 338, at which time the shaft 317 is at rest. The shaft 317 is revolved through suitable connections with the main machine, previously referred to, only after the sectional ring-cylinder has completed its one revolution, and when said shaft is revolved, the clutch being engaged as described, the main escapement-bar C, with which the yoke 221 is connected, is returned, through the connections described, to the position that it occupies at the beginning of a line, causing the entire series of lug-bearing rings 209 to be slid back onto the enlarged portion of the shaft 203. At the commencement of the backward movement of the rings 209 the backward movement of the rackbar 69 causes the tapered piece 311 to be withdrawn from contact with the strips 312 313, interrupting the electric circuit and demagnetizing the magnet 337. When the lever 338 is drawn back by mechanism to be hereinafter described, disengaging the clutch 340 from the gear 214, the corresponding movement of the connecting-rod 344, which is pivoted to the arm 338, by reason of its slot connection 360 at its opposite end fails to disengage the two members 318 and 341 of the clutch, thereby permitting the shaft 317, which still continues to revolve, to effect the complete return movement of the escapement-bar C after the electric circuit has been broken, as described. The teeth of the two members 318 and 341 of the clutch are undercut to prevent them from being separated by a spring 361, connected with the lever 342, until the shaft 317 completes its forward revolutions and commences its backward rotation, when the clutch members are disengaged and the parts are in position for beginning the composition of a new line. This breaking of the circuit stops the motor 602.

*The arrangement of the multiple fingerboards.*—Having now described the construction and mode of operation of one of the sets of ring-setting devices, which is controlled by a single finger-board, I will now describe how a plurality of such sets of ring-setting devices may be arranged in one group to act upon a single matrix or type assembling mechanism without interfering one with another, each finger-board acting upon its own ring-setting device, which acts upon the matrix or type setting mechanism common to all, in such turn and manner as permitted by an electric-circuit-interrupting device T, to be now described.

In the mechanism here shown and described there are three separate sets of ring-setting devices arranged upon a common frame 200, as shown in Fig. 3, each set being a duplicate of each of the others; but a greater number of sets may be arranged in like manner, if desired. The circuit-interrupting device T (shown particularly in Figs. 20 and 21 and at the left-hand end of Fig. 3) consists of a disk 380, of non-conducting substance, which is secured to arms projecting from the frame 200, said disk having inlaid flush with its surface three curved pieces or sections 381, 382, and 383, composed of conducting material, having binding-posts 384 with respective electric connections with the three finger-boards. On a stud 385, supported in an arm 386, projecting from the frame 200, is mounted a commutator provided with a spring conducting-arm 388, which is adapted when rotated, as will be described, to travel in contact with the face of the disks 380 and the strips of conducting substance 381, 382, and 383. On the stud 385 is also placed a clutch-pulley 389, over which passes the driving-belt 390, by means of which it is continuously revolved. This pulley 389 is provided on its inner side with a flange 392, which is embraced by a hook-shaped piece 391, secured to the end of a long shipper-rod 393, extending full length of the multiple finger-board mechanism and provided with fixed collars 394, against which the magnet-levers 338 act when vibrated by the magnets to move the rod 393 against the resistance of a spring 395, Fig. 21, to disengage the clutch-pulley 389 from the commutator to arrest the rotation of the arm 388.

396 is a commutator-brush electrically connected with one pole of the battery by a wire 397.

$x\ y\ z$ represent the lines through which the current passes from the interrupting device T to the several finger-board devices X Y Z to successively but irregularly connect them with the assembling mechanism of the automatic machine, the current passing over such one of said lines as is determined by the interrupting device T and in the following manner: first from the battery to the interrupting device T, thence through a magnet 337, a metallic cylinder I, and the circuit-breakers B to the cable 358, by which it passes through the magnets of the assembling mechanism, and thence through a series of suitable resistances G to the battery. The three lines $x\ y\ z$ are connected to the interrupting device T, as shown in Figs. 20 and 21, the line $x$ being connected with the inlaid conducting-piece 382, the line $y$ with the inlaid piece 381, and the line $z$ with the inlaid piece 383. While the several finger-boards are being independently operated by different operators to set the several series of rings in the composing of several different lines the arm 388 is being continuously revolved by the clutch-pulley 389, which remains in engagement with the commutator 387, which carries said arm until one of the operators has completed the composition of a line and has closed the circuit of his particular finger-board by causing the metallic tapered piece 311 to contact with the spring-strips 312 and 313, which is effected by pressing in the hand-wheel 322, as already described.

Fig. 3 shows the parts of the finger-board mechanisms X Y Z in the following positions: In X the composition of a line is incomplete and its mechanism is consequently cut out of the circuit. In Y the composition of a line is complete and its mechanism is included in the circuit operating the assembling-magnets of the main machine, and in Z the composition of the line is complete, but the circuit is closed only as far as the interrupting device T, the block 311 being in contact with the strips 312 and 313, and consequently the finger-board mechanism Z, though ready for the current, is nevertheless cut out of the circuit. When the operator at Y completed his composed line and closed his circuit, as described, up to the conducting-piece 381 in the interrupting device T, with which piece his circuit $y$ is directly connected, the arm 388 was revolving in the direction of the arrow, Fig. 20, and the instant said arm 388 contacted with the inlaid piece 381 the circuit was completed through the commutator-brush 396, thus energizing the particular magnets 337 of the mechanism Y and vibrating the lever 338 to draw the rod 393 against the resistance of the spring 395, and thereby withdraw the clutch 389 from engagement with the commutator 387, which carries the arm 388, thus stopping said arm in contact with the inlaid piece 381, and although the operator at the finger-board Z had completed his composed line and had closed his circuit $z$ as far as the inlaid piece 382 in the interrupting device T, with which piece his circuit is directly connected, it is impossible for his mechanism to be cut into the circuit until the arm 388 is again revolved to contact with the inlaid conducting-piece 382. The arm 388 is again set in motion in the direction of the arrow by the breaking of the circuit $y$ by the automatic withdrawal of the tapered block 311 from contact with the spring-strips 312 and 313, as previously described, which demagnetizes the magnet 337, allowing its armature-lever 338 to release the rod 393, which is then actuated by the spring 395 to engage the clutch-pulley 389 with the commutator 387, which carries the arm 388, which then commences to rotate until it contacts with the inlaid piece 382 of circuit $z$, which the operator, as before stated, previously completed up to this point. The magnet 337 of finger-board mechanism Z is then energized, which again disconnects the clutch-pulley 389 and stops the arm 388, as before. The instant that the magnet 337 of the finger-board mechanism Z is energized this magnet is included in the circuit to operate the assembling-magnets of the main machine. If the operator at Z had not completed the composition of his line when the arm 388 commenced to revolve, said arm would not have been arrested on contacting with the inlaid piece 382, but would have passed over the same and would have been arrested only upon contacting with the first inlaid piece connected with the circuit next completed by any one of the operators who may have first completed his line. In this manner a number of operators can work simultaneously without loss of time and without interfering with each other, thereby materially increasing the capacity of the single assembling and casting mechanisms already described.

*The general operation.*—Having described the several parts of the machine and their individual operations, I will now describe the operation of the machine as a whole. The matrix-strips and their actuating-carriages carrying the two sets of magnets, standing in the position shown in Fig. 3, are normally at rest and remain in this condition until one of the three operators delivers his line of composed rings, as described. This sets in operation the motor 602 by closing an electric circuit leading thereto, when the cam-shaft 454 will commence to revolve. The cam 453 on this shaft then, through the connections described, causes the gears 445 446 to revolve in opposite directions, thereby transmitting corresponding opposite movements to the carriages 436 437, the rack-bar 443, to which the carriage 436 is connected, further transmitting this motion to a gear 586 on a shaft 587, carrying a beveled gear 588, meshing with a beveled gear 589 on a shaft 218, the opposite end of which is provided with a gear 217, meshing with a gear 216 on the long shaft 215, which by these connections is caused to move synchronously with the carriages 436 and 437. Now when the operator delivers his line to produce these movements one of the three magnets 337, operating a clutch 340, is automatically energized, which causes his particular series of composing-rings to revolve, and thereby break the assembling-circuits, as described, during the outward movements of the carriages. When these circuits are thus broken, the various armature-arms 430 normally held down to their magnets against the resistance of the springs 434, as shown in Fig. 2, are released and moved upwardly, entirely freeing the matrix-strips from the moving carriages by unlatching the outer ends 431 from the transverse bars 440 thereof and at the same time causing the short projections 432 of said armature-arms to engage the transverse grooves of the hinged plates 433, which thus lock the matrix-strips in their various stopped positions. The matrix-strips are now clamped laterally by the movement of the clamping-bar 464, and at the same time the alining-blade 457 descends into the approximately alined notches 459 of the matrix-strips, bringing them into exact alinement. The parts are now ready for the casting operation, and the melting-pot 478 and mechanism connected therewith are immediately forced upward, causing the mouthpiece of the melting-pot to enter the tapered opening 427 in the table 426, upon which the matrix-strips slide, the printing-bar blank 479 having been previously inserted between the two portions of the mouthpiece and directly over the valve-ports 494. The valve 534 is now rotated by the rack-bar 538, which is actuated by the cam 542 and intermediate connections, (shown in Fig. 2,) and the molten metal in the main central chamber 502, which is under constant pressure, is then injected through the passages of the printing-bar blank into the mold-chamber and against the alined matrix-strips, where it is permitted to solidify. The casting mechanism is then withdrawn and the finished printing-bar ejected into the inclined chute 547, down which it slides into its proper receiving-galley. After the matrix-strips have been assembled the carriages 436 and 437 continue to move outwardly to a fixed position, where they rest until the completion of the casting operation, when they are moved inward to their normal position. (Shown in Fig. 2.) During this inward movement the distribution of the matrix-strips, previously assembled, as shown in Fig. 6, is effected by the inner edges of the carriages striking against the projections 429 on the thick ends of said matrix-strips, the hinged plates 433 and the alining-blade 457 having been raised and the clamping-bar withdrawn previous to the inward movement of the carriages, when the matrix-strip-assembling mechanism and casting device are in position to be set in operation by the same or a different finger-board mechanism, as determined by the circuit-interrupting device, the operation of which has been fully described.

What I claim as my invention, and desire to secure by Letters Patent, is—

1. The combination with carriers moving in opposite directions, of arms having a plurality of matrix-strips connected therewith, the hooks on the ends of said arms for temporarily connecting the same with said carriers, a plurality of magnets for holding the hooks in engagement with the carriers, and springs for disconnecting said hooks from said carriers, when said magnets are demagnetized.

2. The combination of a multiple series of circuit-breaking rings temporarily set by a plurality of finger boards, a plurality of magnets electrically controlled thereby, carriers having said magnets mounted thereon, arms having a plurality of matrix-strips connected therewith, means whereby said arms are temporarily connected with said carriers, and springs for disconnecting said arms from said carriers to arrest the advance of the matrix-strips.

3. The combination of a multiple series of circuit-breaking rings temporarily set by a plurality of finger-boards, a multiple series of circuit-breaking levers, a plurality of magnets electrically connected therewith, carriers having said magnets mounted thereon, arms having a plurality of matrix-strips connected therewith, means whereby said arms are temporarily connected with said carriers, and springs for disconnecting said arms from said carriers to arrest the advance of the matrix-strips.

4. The combination with carriers moving in opposite directions, of arms having a plurality of matrix-strips connected therewith, the hooks on the ends of said arms for temporarily connecting the same with said carriers, a plurality of magnets for holding the hooks in engagement with the carriers, springs for disconnecting said hooks from said carriers, when said magnets are demagnetized, projections on the edges of said arms, and hinged plates provided with indentations for the reception of said projections, whereby the matrix-strips are instantly locked with the selected characters in a common transverse line when freed from the carriers.

5. In a machine for producing printing-bars, the combination of a multiple series of circuit-breaking devices, a plurality of electromagnets controlled thereby, arms having a plurality of independently-movable matrix-strips connected therewith and adapted to be actuated by said magnets to arrest the individual matrix-strips with the selected characters in a common transverse line, and a casting mechanism for supplying molten metal to the alined recesses in the matrix-strips.

6. In a machine for producing printing-bars, the combination of a multiple series of lug-bearing rings, a multiple series of circuit-breaking levers operated thereby, a plurality of magnets electrically connected therewith, arms having a plurality of independently-movable matrix-strips connected therewith and adapted to be actuated by said magnets to arrest the individual matrix-strips, with the selected characters in a common transverse line, and a casting mechanism for supplying molten metal to the alined recesses in the matrix-strips.

7. The matrix-strips arranged in two distinct series and adapted to slide beside each other in opposite directions, in combination with carriers moving in opposite directions, means whereby the matrix-strips are individually connected with said carriers and released therefrom, and a multiple series of circuit-breakers controlling magnets for effecting the engagement of said matrix-strips with the carriers and their release therefrom.

8. The combination with the plurality of tapering matrix-strips, each provided with intaglio characters, of a matrix-assembling mechanism comprising a pair of carriers provided with means for temporarily engaging said strips and moving the same in opposite directions, and a series of magnets controlled by composing mechanisms operated by keyboards, for disengaging said matrix-strips from said carriers, when the selected characters on said strips have reached a common transverse casting-line.

9. A multiple series of circuit-breaking devices adapted to be arranged by a plurality of finger-boards, in combination with the plurality of magnets mounted on carriers, a plurality of armature-arms having matrix-strips connected therewith and temporarily held in engagement with the carriers by said magnets, hinged plates provided with indentations for receiving projections on said armature-arms when the latter are released by the magnets, and springs for throwing said arms into engagement with said hinged plates when released by the magnets.

10. In a machine for producing printing-bars, a plurality of finger-boards and a series of circuit-breaking devices, in combination with mechanism for assembling matrices and mechanism for casting printing-bars therefrom.

11. The combination of a multiple series of set-rings, a multiple series of circuit-breakers, operated by said rings, a plurality of magnets electrically connected with said circuit-breakers, the movable matrix-strips, carriers adapted to be temporarily connected therewith, means for reciprocating the carriers and intermediate connections, whereby any one of said multiple series of set-rings is caused to revolve synchronously with the movement of the carriers.

12. The combination with carriers moving in opposite directions and having a plurality of magnets mounted thereon, of independently-movable matrix-strips, armature-arms pivoted thereto and provided with actuating-springs, stops for limiting the movement of said arms when released by said magnets, hinged plates provided with indentations for receiving locking projections on said arms when actuated by said springs, and means for moving said hinged plates out of engagement with the locking projections of said arms to permit the return of the matrix-strips to their normal position, and subsequently moving said hinged plates in the opposite direction to force said arms against the resistance of their springs into engagement with the carriers and bring them into a position to be held by said magnets.

13. The independently-movable matrix-strips each provided at one end with a projection, in combination with movable carriers adapted to contact with said projections and thereby force back the said matrix-strips to their normal position after having been drawn out to present the desired characters at a common transverse casting-line.

14. The matrix-strips each having recesses in one edge provided at their bottoms with intaglio characters, said recesses when brought to a common transverse line constituting a molding-chamber in combination with a printing-bar blank less than type high and of a thickness corresponding to the printing-faces to be formed upon its edge, said blank having apertures extending therethrough for the passage of molten or plastic material into the recesses of said matrix-strips for the formation of a printing-bar.

15. In a machine for producing printing-bars, the combination with a plurality of independently-movable matrix-strips provided with recesses having intaglio characters at their bottoms, of a printing-bar blank having apertures extending therethrough, a melting-pot provided with a mouthpiece for the reception of said blank, and means for moving the melting-pot to bring the mouthpiece thereof with the blank up to the alined recesses of the matrix-strips.

16. The combination with a plurality of independently-movable matrix-strips provided with recesses having intaglio characters at their bottoms, of the movable melting-pot provided with a mouthpiece composed of stationary and movable portions and having its outer end tapered to fit a correspondingly-tapered opening in the table on which said matrix-strips move, whereby the printing-bar blank held between the two portions of the mouthpiece is gripped tightly as the mouthpiece enters said tapered opening in the table.

17. In a machine for producing printing-bars, a melting-pot provided with a mouthpiece for receiving a printing-bar blank, and having a valve for controlling the admission of molten metal to the molding-chamber, and means for operating the valve.

18. In a machine for producing printing-bars, the combination with the melting-pot, of a device for holding a printing-bar blank, provided with passage-ways and indentations on one edge, a valve-casing having a series of projections adapted to enter said indentations and provided with ports, and a valve having a series of openings adapted to register with said ports, and means for operating said valve.

19. In a machine for producing printing-bars, a melting-pot provided with a valve having openings of different lengths arranged to permit the molten metal to pass successively through a series of ports to the molding-chamber, whereby the air is gradually driven out of the same as the metal is forced in.

20. In a machine for producing printing-bars, the combination with a plurality of independently-movable matrix-strips provided with recesses having intaglio characters at their bottoms, said recesses when brought to a common transverse line forming the molding-chamber, of a device for holding a printing-bar blank provided with passage-ways, and indentations in one edge; said device with the blank therein being adapted, when advanced, to close the open side of the molding-chamber, a melting-pot having a valve-casing provided with a series of projections adapted to enter the indentations of the blank, and provided with ports registering with the apertures in said blank, a valve having a series of openings of different lengths arranged to permit the molten metal to pass into the molding-chamber successively through the apertures of the printing-bar blank, and means for operating the valve.

21. In a machine for producing printing-bars, a melting-pot provided with a central reservoir for containing the molten metal, said reservoir having a discharge-opening, and an annular receiving-chamber encircling said central reservoir and communicating therewith through a suitable passage, in combination with a plunger for compressing the metal in the central reservoir, whereby the molten metal is ejected through the discharge-opening, and means for operating said plunger.

22. In a machine for producing printing-bars, the combination with an alined series of matrices and the melting-pot and its plunger, of a device acting on said plunger to cause it to maintain a constant pressure on the molten metal in said pot.

23. In a machine for producing printing-bars, the combination with the melting-pot, of a plunger, a spring for exerting pressure on the same, and means for automatically maintaining the tension of said spring as the plunger advances upon the discharge of the metal from the melting-pot.

24. In a machine for producing printing-bars, the combination with the melting-pot and its plunger, of an automatic device acting on said plunger to cause it to maintain a constant pressure on the molten metal in said pot, said device comprising a slotted block adapted to be turned to vary the inclination of its slot, a compensating lever and intermediate connections for turning said slotted block as the metal is discharged from the melting-pot, a bar carrying a roll engaging said slotted block, a ratchet-nut operated by a pawl on said bar, a screw-shaft loosely connected with the plunger and operated by said ratchet-nut, and a spring encircling said shaft between a collar thereon and said plunger.

25. In a machine for producing printing-bars, the combination with a melting-pot having a series of chambers for containing the molten metal, of an electric heating device interposed between said chambers.

26. In a machine for producing printing-bars, the combination with the melting-pot having a central chamber and an annular chamber encircling the same, of an electric heating device interposed between said chambers.

27. In a machine for producing printing-bars, the combination with the melting-pot and its plunger, of a screw-shaft connected with said plunger, and means for withdrawing said shaft and plunger when the melting-pot is to be replenished with metal.

28. In a machine for producing printing-bars, the combination with guides for the printing-bar blanks and a spring-actuated follower for pressing forward said blanks, of a carrier for transferring said blanks, one at a time, from said guides to the casting position and subsequently carrying the blanks with the printing-face cast thereon beyond the casting position, and a tapered bar for engaging the foremost end of the printing-bar and delivering it from the carrier to a chute or receiver.

29. In a machine for producing printing-bars, the combination with a multiple finger-board mechanism, of a multiplex receiving-galley, and means for delivering the printing-bars from the casting mechanism to their proper compartments in said galley.

30. In a machine for producing printing-bars, a multiplex printing-bar-receiving galley having a series of distinct compartments corresponding in number to the finger-boards, and means for automatically placing any particular printing-bar in its proper compartment in said galley.

31. In a machine for producing printing-bars, a multiplex printing-bar-receiving galley having a series of distinct compartments corresponding in number to the finger-boards, and a series of movable stops adapted to arrest the delivered printing-bars, each in line with its proper compartment in said galley, said movable stops being operated each by one of the series of composing devices with which it is connected, and means for placing the printing-bars within the compartments after being arrested by said stops.

32. In a machine for producing printing-bars, the combination with a plurality of finger-boards and mechanisms for assembling matrices and casting printing-bars therefrom, of intermediate devices coöperating with said finger-boards and assembling and casting mechanisms for determining the selection and assembling of said matrices.

33. In a machine for producing printing-bars, a casting device and a plurality of finger-boards, in combination with a matrix-assembling mechanism in which the selection of intaglio characters is effected purely mechanically by a series of devices which have been acted upon by said finger-boards.

34. A plurality of finger-boards operable simultaneously, a series of devices acting upon a matrix-assembling mechanism, a melting-pot, and intermediate devices for effecting the discharge of the molten metal against the matrices.

35. In a machine for producing printing-bars, the combination with an alined series of intaglio characters, of a melting-pot and its actuating mechanism, and a blank or foundation-piece having apertures extending therethrough, said blank being interposed between said intaglio characters and said melting-pot, and the apertures in said blank serving to convey the molten metal from the melting-pot to the molding-chamber.

36. In a machine for producing printing-bars, a melting-pot and its actuating mechanism, and an alined series of intaglio characters, in combination with a blank or foundation-piece having apertures extending therethrough for the flow of metal to produce a cast edge bearing printing-faces.

37. In a machine for producing printing-bars, the combination with an alined series of intaglio characters, of a melting-pot and its actuating mechanism, and a blank or foundation-piece having apertures therethrough for molten metal, and an aperture for the escape of air from the molding-chamber, said blank being interposed between said intaglio characters and said melting-pot for the purpose of receiving a cast edge bearing printing-faces.

38. In a machine for producing printing-bars, the combination with an alined series of intaglio characters, of a melting-pot and its actuating mechanism, and a blank or foundation-piece less than type high, of a thickness corresponding to the size of the alined characters and having apertures extending therethrough for conveying molten metal, and a passage-way for the escape of air, said blank being interposed between said intaglio characters and said melting-pot for the purpose of receiving a cast edge bearing printing-faces.

Witness my hand this 26th day of August, A. D. 1898.

ERL V. BEALS.

In presence of—
P. E. TESCHEMACHER,
M. B. WILSON.